US009736110B2

(12) United States Patent
Li et al.

(10) Patent No.: US 9,736,110 B2
(45) Date of Patent: Aug. 15, 2017

(54) METHOD AND APPARATUS FOR ACQUIRING IP ADDRESS BY DHCP CLIENT

(71) Applicant: Huawei Technologies Co., Ltd., Shenzhen (CN)

(72) Inventors: Quancai Li, Hangzhou (CN); Bo Man, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 251 days.

(21) Appl. No.: 14/812,063

(22) Filed: Jul. 29, 2015

(65) Prior Publication Data

US 2015/0334085 A1 Nov. 19, 2015

Related U.S. Application Data

(63) Continuation of application No. PCT/CN2013/090807, filed on Dec. 28, 2013.

(30) Foreign Application Priority Data

Feb. 1, 2013 (CN) .......................... 2013 1 0058769

(51) Int. Cl.
*H04L 29/12* (2006.01)
*H04L 12/715* (2013.01)

(52) U.S. Cl.
CPC .......... *H04L 61/2015* (2013.01); *H04L 45/64* (2013.01)

(58) Field of Classification Search
CPC .................................................. H04L 61/2015
(Continued)

(56) References Cited

U.S. PATENT DOCUMENTS 7,757,000 B1 * 7/2010 Kinnear, Jr. ...... H04L 29/12028
709/230
7,869,394 B1 * 1/2011 Boden, Jr. ........... H04L 12/4641
370/328
(Continued)

FOREIGN PATENT DOCUMENTS

CN 101035012 A 9/2007
CN 101047618 A 10/2007
(Continued)

OTHER PUBLICATIONS

Coxhead, "Improving the Security and Efficiency of Network Clients Using OpenFlow", 2013.*
(Continued)

*Primary Examiner* — Ondrej C. Vostal
(74) *Attorney, Agent, or Firm* — Conley Rose, P.C.

(57) ABSTRACT

A method and an apparatus for acquiring an Internet Protocol (IP) address by a Dynamic Host Configuration Protocol, Dynamic Host Configuration Protocol (DHCP) client. The method includes generating, by a controller, a first DHCP discover packet, forwarding, by the controller, the first DHCP discover packet to a DHCP server through a switch so that the DHCP server generates a DHCP offer packet, and sends the DHCP offer packet to the switch, receiving, by the controller, the DHCP offer packet and port information of the switch to communicate with the DHCP server, wherein the DHCP offer packet and the port are reported by the switch, acquiring address information of the DHCP server, and generating, by the controller according to the address information and the port, a forwarding rule for forwarding from the switch to the DHCP server, to assist the DHCP client in acquiring an IP address of the DHCP client.

21 Claims, 6 Drawing Sheets

(58) Field of Classification Search
USPC .......................................................... 709/245
See application file for complete search history.

(56) References Cited

U.S. PATENT DOCUMENTS

| | | | | |
|---|---|---|---|---|
| 2003/0058813 | A1* | 3/2003 | Viola | H04L 29/12273 370/328 |
| 2007/0061458 | A1* | 3/2007 | Lum | H04L 61/2015 709/225 |
| 2008/0075985 | A1* | 3/2008 | Gottmann | H01M 8/04231 429/432 |
| 2010/0122338 | A1* | 5/2010 | Kataoka | H04L 61/2015 726/12 |
| 2013/0097335 | A1* | 4/2013 | Jiang | H04L 61/2528 709/245 |
| 2013/0275620 | A1* | 10/2013 | Morita | H04L 45/42 709/244 |
| 2014/0052830 | A1* | 2/2014 | Bigall | H04L 41/0803 709/220 |

FOREIGN PATENT DOCUMENTS

| | | | |
|---|---|---|---|
| CN | 101938526 A | | 1/2011 |
| CN | 102075590 A | * | 5/2011 |
| CN | 102255814 A | | 11/2011 |
| WO | 2012144583 A1 | | 10/2012 |

OTHER PUBLICATIONS

Droms, "Dynamic Host Configuration Protocol", RFC2131, 1997.*
Kempf et al., "Scalable Fault Management for OpenFlow", 2012.*
Kotani et al., "A design and implementation of OpenFlow Controller handling IP multicast with Fast Tree Switching", 2012.*
Pfaff et al., "OpenFlow Switch Specification Version 1.1.0 Implemented ( Wire Protocol 0x02 )", 2011.*
Plummer, "An Ethernet Address Resolution Protocol", RFC826, 1982.*
Scott-Hayward et al., "SDN Security: A SUrvey", 2013.*
Sharma et al., "Enabling Fast Failure Recovery in OpenFlow Networks", 2011.*
Foreign Communication From a Counterpart Application, PCT Application No. PCT/CN2013/090807, English Translation of International Search Report dated Mar. 6, 2014, 2 pages.
Foreign Communication From a Counterpart Application, PCT Application No. PCT/CN2013/090807, English Translation of Written Opinion dated Mar. 6, 2014, 7 pages.
Matias, J., et al., "Implementing Layer 2 Network Virtualization using OpenFlow: Challenges and Solutions," European Workshop on Software Defined Networking, Oct. 26, 2012, 6 pages.
Foreign Communication From a Counterpart Application, European Application No. 13873737.4, Extended European Search Report dated Mar. 8, 2016, 9 pages.
Foreign Communication From a Counterpart Application, Chinese Application No. 201310058769.4, Chinese Office Action dated Nov. 2, 2016, 9 pages.

* cited by examiner

METHOD AND APPARATUS FOR ACQUIRING IP ADDRESS BY DHCP CLIENT

CROSS-REFERENCE TO RELATED APPLICATIONS

This application is a continuation of International Application No. PCT/CN2013/090807, filed on Dec. 28, 2013, which claims priority to Chinese Patent Application No. 201310058769.4, filed on Feb. 1, 2013, both of which are hereby incorporated by reference in their entireties.

TECHNICAL FIELD

The present disclosure relates to the communications field, and in particular, to a method and an apparatus for acquiring an internet protocol (IP) address by a Dynamic Host Configuration Protocol (DHCP) client.

BACKGROUND

With continuous development of the Internet, services of people on the Internet impose an increasing high requirement for transmission quality on the Internet, and then an openflow network emerges, where the openflow network is a new network that supports a network innovation research.

If a DHCP client in an openflow network needs to obtain an IP address, when the DHCP client starts, the DHCP client broadcasts a DHCP discover packet that is used to acquire the IP address. Then, a controller in the openflow network performs broadcast processing on the received DHCP discover packet according to a rule for forwarding an ordinary packet. Finally, after receiving the DHCP discover packet, a DHCP server in the network sends, to the DHCP client, a DHCP offer packet that includes the IP address allocated to the DHCP client so that the DHCP client acquires the IP address. Alternatively, information such as an address of the DHCP server may be manually pre-configured in the controller of the openflow network so that if the DHCP client sends the DHCP discover packet to request to acquire the IP address, the controller may generate, according to the pre-configured information such as the address of the DHCP server, a forwarding rule that is used to indicate a network path for acquiring the IP address by the DHCP client, and in this way, the DHCP client acquires the IP address according to the network path indicated by the forwarding rule.

However, if the DHCP discover packet is processed in a form of broadcasting, another DHCP client and a switch in the network both receive the DHCP discover packet, which wastes network bandwidth and lowers network efficiency. If a method in which the information such as the address of the DHCP server is manually pre-configured is used, once the information such as the address of the DHCP server is modified, configuration information of the controller needs to be manually modified, which brings great inconvenience for people' maintenance.

SUMMARY

Embodiments of the present disclosure provide a method and an apparatus for acquiring an IP address by a DHCP client, which are used to solve problems in the prior art that network bandwidth is wasted, network efficiency is lowered, and people's maintenance is inconvenient so that it is convenient for the DHCP client to acquire an IP address of the DHCP client.

To achieve the foregoing objectives, the following technical solutions are used in the embodiments of the present disclosure.

According to a first aspect, an embodiment of the present disclosure provides a method for acquiring an IP address by a DHCP client, including generating, by a controller, a first DHCP discover packet, sending, by the controller, the first DHCP discover packet to a switch so that the switch forwards the first DHCP discover packet to a DHCP server, and then after the DHCP server generates a DHCP offer packet corresponding to the first DHCP discover packet, the DHCP server sends the DHCP offer packet to the switch, where the DHCP offer packet includes address information of the DHCP server; receiving, by the controller, a packet reported by the switch, where the packet includes the DHCP offer packet and a port that is of the switch and is used to communicate with the DHCP server, and acquiring the address information of the DHCP server according to the DHCP offer packet, and generating, by the controller according to the address information and the port, a forwarding rule for forwarding from the switch to the DHCP server so that the switch can forward, to the DHCP server according to the forwarding rule, a second DHCP discover packet sent by the DHCP client, and then the DHCP server allocates an IP address of the DHCP client to the DHCP client, where the forwarding rule is used to indicate a network path from the switch to the DHCP server, and the second DHCP discover packet is sent when the DHCP client needs to acquire the IP address of the DHCP client.

In a first possible implementation manner of the first aspect, the generating, by the controller according to the address information and the port, a forwarding rule for forwarding from the switch to the DHCP server so that the switch can forward, to the DHCP server according to the forwarding rule, a second DHCP discover packet sent by the DHCP client, and then the DHCP server allocates an IP address of the DHCP client to the DHCP client includes receiving, by the controller, the second DHCP discover packet reported by the switch, generating, by the controller, the forwarding rule according to the address information of the DHCP server and the port, and sending, by the controller, the forwarding rule to the switch so that the switch forwards the second DHCP discover packet to the DHCP server according to the forwarding rule, and then the DHCP server allocates the IP address of the DHCP client to the DHCP client.

In a second possible implementation manner of the first aspect, the controller periodically performs the steps in the first aspect in sequence.

With reference to the first aspect or any one possible implementation manner of the first possible implementation manner to the second possible implementation manner of the first aspect, in a third possible implementation manner, the controller and the switch are respectively a controller and a switch in an openflow network.

With reference to the third possible implementation manner of the first aspect, in a fourth possible implementation manner, the sending, by the controller, the first DHCP discover packet to a switch so that the switch forwards the first DHCP discover packet to a DHCP server includes sending, by the controller to the switch, a packet-out (packet_out) message carrying the first DHCP discover packet so that the switch forwards the first DHCP discover packet to the DHCP server according to the packet-out message, where the packet-out message is used to instruct the switch to forward the first DHCP discover packet to the DHCP server.

With reference to the third possible implementation manner of the first aspect, in a fifth possible implementation manner, the receiving, by the controller, a packet reported by the switch, where the reported packet includes the DHCP offer packet and a port that is of the switch and is used to communicate with the DHCP server includes receiving, by the controller, a packet-in (packet_in) message reported by the switch, where the packet-in message includes an openflow message header and a payload, where the openflow message header includes the port and the payload includes the DHCP offer packet.

With reference to the first aspect or any one possible implementation manner of the first possible implementation manner to the fifth possible implementation manner of the first aspect, in a sixth possible implementation manner, the address information of the DHCP server includes an IP address of the DHCP server and a Media Access Control (MAC) address of the DHCP server.

With reference to the first aspect or any one possible implementation manner of the first possible implementation manner to the sixth possible implementation manner of the first aspect, in a seventh possible implementation manner, the acquiring, by the controller, the address information of the DHCP server according to the DHCP offer packet includes acquiring, by the controller, the IP address of the DHCP server and the MAC address of the DHCP server according to the DHCP offer packet.

According to a second aspect, an embodiment of the present disclosure provides a method for acquiring an IP address by a DHCP client, including receiving, by a switch, a first DHCP discover packet from a controller, where the first DHCP discover packet is generated by the controller, forwarding, by the switch, the first DHCP discover packet to a DHCP server so that the DHCP server generates a DHCP offer packet corresponding to the first DHCP discover packet, where the DHCP offer packet includes address information of the DHCP server, receiving, by the switch, the DHCP offer packet from the DHCP server, reporting, by the switch, a packet to the controller, where the packet includes the DHCP offer packet and a port that is of the switch and is used to communicate with the DHCP server so that the controller acquires the address information of the DHCP server according to the DHCP offer packet, and generates, according to the address information and the port, a forwarding rule for forwarding from the switch to the DHCP server, where the forwarding rule is used to indicate a network path from the switch to the DHCP server, and forwarding, by the switch to the DHCP server according to the forwarding rule, a second DHCP discover packet sent by the DHCP client so that the DHCP server allocates an IP address of the DHCP client to the DHCP client, where the second DHCP discover packet is sent when the DHCP client needs to acquire the IP address of the DHCP client.

In a first possible implementation manner of the second aspect, the forwarding, by the switch to the DHCP server according to the forwarding rule, a second DHCP discover packet sent by the DHCP client so that the DHCP server allocates an IP address of the DHCP client to the DHCP client includes receiving, by the switch, the second DHCP discover packet from the DHCP client, reporting, by the switch, the second DHCP discover packet to the controller so that the controller generates the forwarding rule according to the address information of the DHCP server and the port, and receiving, by the switch, the forwarding rule for forwarding from the controller, and forwarding the second DHCP discover packet to the DHCP server according to the forwarding rule so that the DHCP server allocates the IP address of the DHCP client to the DHCP client.

With reference to the second aspect or the first possible implementation manner of the second aspect, in a second possible implementation manner, the controller and the switch are respectively a controller and a switch in an openflow network.

With reference to the second possible implementation manner of the second aspect, in a third possible implementation manner, the receiving, by a switch, a first DHCP discover packet from a controller, and the forwarding, by the switch, the first DHCP discover packet to a DHCP server include receiving, by the switch, a packet-out message that carries the first DHCP discover packet and is from the controller, where the packet-out message is used to instruct the switch to forward the first DHCP discover packet to the DHCP server, and forwarding, by the switch, the first DHCP discover packet to the DHCP server according to the packet-out message.

With reference to the second possible implementation manner of the second aspect, in a fourth possible implementation manner, the reporting, by the switch, a packet to the controller, where the reported packet includes the DHCP offer packet and a port that is of the switch and is used to communicate with the DHCP server includes reporting, by the switch, a packet-in message to the controller, where the packet-in message includes an openflow message header and a payload, where the openflow message header includes the port and the payload includes the DHCP offer packet.

With reference to the second aspect or any one possible implementation manner of the first possible implementation manner to the fourth possible implementation manner of the second aspect, in a fifth possible implementation manner: the address information of the DHCP server includes an IP address of the DHCP server and a MAC address of the DHCP server.

According to a third aspect, an embodiment of the present disclosure provides a controller, including a first processing unit configured to generate a first DHCP discover packet, a first sending unit configured to send the first DHCP discover packet to a switch so that the switch forwards the first DHCP discover packet to a DHCP server, and then after the DHCP server generates a DHCP offer packet corresponding to the first DHCP discover packet, the DHCP server sends the DHCP offer packet to the switch, where the DHCP offer packet includes address information of the DHCP server, and a first receiving unit configured to receive a packet reported by the switch, where the packet includes the DHCP offer packet and a port that is of the switch and is used to communicate with the DHCP server, where the first processing unit is further configured to acquire the address information of the DHCP server according to the DHCP offer packet, and generate, according to the address information and the port, a forwarding rule for forwarding from the switch to the DHCP server so that the switch can forward, to the DHCP server according to the forwarding rule, a second DHCP discover packet sent by a DHCP client, and then the DHCP server allocates an IP address of the DHCP client to the DHCP client, where the forwarding rule is used to indicate a network path from the switch to the DHCP server, and the second DHCP discover packet is sent when the DHCP client needs to acquire the IP address of the DHCP client.

In a first possible implementation manner of the third aspect the first receiving unit is further configured to receive the second DHCP discover packet reported by the switch, the first processing unit is further configured to generate the forwarding rule according to the address information of the DHCP server and the port, and the first sending unit is further configured to send the forwarding rule to the switch so that the switch forwards the second DHCP discover packet to the DHCP server according to the forwarding rule, and then the DHCP server allocates the IP address of the DHCP client to the DHCP client.

With reference to the third aspect or the first possible implementation manner of the third aspect, in a second possible implementation manner, the controller and the switch are respectively a controller and a switch in an openflow network.

With reference to the second possible implementation manner of the third aspect, in a third possible implementation manner: the first sending unit is configured to send, to the switch, a packet-out message carrying the first DHCP discover packet so that the switch forwards the first DHCP discover packet to the DHCP server according to the packet-out message, where the packet-out message is used to instruct the switch to forward the first DHCP discover packet to the DHCP server.

With reference to the second possible implementation manner of the third aspect, in a fourth possible implementation manner, the first receiving unit is configured to receive a packet-in message reported by the switch, where the packet-in message includes an openflow message header and a payload, where the openflow message header includes the port and the payload includes the DHCP offer packet.

With reference to the third aspect or any one possible implementation manner of the first possible implementation manner to the fourth possible implementation manner of the third aspect, in a fifth possible implementation manner, the address information of the DHCP server includes an IP address of the DHCP server and a MAC address of the DHCP server.

With reference to the third aspect or any one possible implementation manner of the first possible implementation manner to the fifth possible implementation manner of the third aspect, in a sixth possible implementation manner: the first processing unit is configured to acquire the IP address of the DHCP server and the MAC address of the DHCP server according to the DHCP offer packet.

According to a fourth aspect, an embodiment of the present disclosure provides a switch, including a second receiving unit configured to receive a first DHCP discover packet from a controller, where the first DHCP discover packet is generated by the controller, and a second sending unit configured to forward the first DHCP discover packet to a DHCP server so that the DHCP server generates a DHCP offer packet corresponding to the first DHCP discover packet, where the DHCP offer packet includes address information of the DHCP server, where the second receiving unit is further configured to receive the DHCP offer packet from the DHCP server, the second sending unit is further configured to report a packet to the controller, where the packet includes the DHCP offer packet and a port that is of the switch and is used to communicate with the DHCP server so that the controller acquires the address information of the DHCP server according to the DHCP offer packet, and generates, according to the address information and the port, a forwarding rule for forwarding from the switch to the DHCP server, where the forwarding rule is used to indicate a network path from the switch to the DHCP server, and the second sending unit is further configured to forward, to the DHCP server according to the forwarding rule, a second DHCP discover packet sent by a DHCP client so that the DHCP server allocates an IP address of the DHCP client to the DHCP client, where the second DHCP discover packet is sent when the DHCP client needs to acquire the IP address of the DHCP client.

In a first possible implementation manner of the fourth aspect, the second receiving unit is further configured to receive the second DHCP discover packet from the DHCP client, the second sending unit is further configured to report the second DHCP discover packet to the controller so that the controller generates the forwarding rule according to the address information of the DHCP server and the port, the second receiving unit is further configured to receive the forwarding rule for forwarding from the controller, and the second sending unit is further configured to forward the second DHCP discover packet to the DHCP server according to the forwarding rule so that the DHCP server allocates the IP address of the DHCP client to the DHCP client.

With reference to the fourth aspect or the first possible implementation manner of the fourth aspect, in a second possible implementation manner, the controller and the switch are respectively a controller and a switch in an openflow network.

With reference to the second possible implementation manner of the fourth aspect, in a third possible implementation manner, the second receiving unit is configured to receive a packet-out message that carries the first DHCP discover packet and is from the controller, where the packet-out message is used to instruct the switch to forward the first DHCP discover packet to the DHCP server; and the second sending unit is configured to forward the first DHCP discover packet to the DHCP server according to the packet-out message.

With reference to the second possible implementation manner of the fourth aspect, in a fourth possible implementation manner, the second sending unit is configured to report a packet-in message to the controller, where the packet-in message includes an openflow message header and a payload, where the openflow message header includes the port and the payload includes the DHCP offer packet.

With reference to the fourth aspect or any one possible implementation manner of the first possible implementation manner to the fourth possible implementation manner of the fourth aspect, in a fifth possible implementation manner, the address information of the DHCP server includes an IP address of the DHCP server and a MAC address of the DHCP server.

According to the method and the apparatus for acquiring an IP address by a DHCP client that are provided in the embodiments of the present disclosure, a controller generates a first DHCP discover packet, and forwards the first DHCP discover packet to a DHCP server through a switch so that after the DHCP server generates a DHCP offer packet corresponding to the first DHCP discover packet and sends the DHCP offer packet to the switch, the controller receives a packet reported by the switch, where the packet includes the DHCP offer packet and a port that is of the switch and is used to communicate with the DHCP server; the controller acquires address information of the DHCP server according to the DHCP offer packet, where the DHCP offer packet includes the address information of the DHCP server; the controller generates, according to the address information and the port, a forwarding rule for forwarding from the switch to the DHCP server so that the switch can forward, to the DHCP server according to the forwarding rule, a second DHCP discover packet sent by the DHCP client, and then the DHCP server allocates an IP address of the DHCP client to the DHCP client. By using this solution, the controller actively acquires information such as the address information of the DHCP server and the port that is of the switch and is used to communicate with the DHCP server. Therefore, if a DHCP client in a network needs to acquire an IP address of the DHCP client from the DHCP server, the controller may generate, directly according to the foregoing acquired information such as the address information of the DHCP server and the port that is of the switch and is used to communicate with the DHCP server, a forwarding rule that is used to indicate a network path from the switch to the DHCP server. In this way, the DHCP client can acquire the IP address of the DHCP client from the DHCP server through the switch, which avoids a problem in the prior art that a controller assists, in a form of broadcasting, a DHCP client in acquiring an IP address of the DHCP client, or information such as an address of a DHCP server needs to be manually pre-configured on the controller; saves network bandwidth; improves network efficiency; and facilitates people's maintenance.

BRIEF DESCRIPTION OF DRAWINGS

To describe the technical solutions in the embodiments of the present disclosure more clearly, the following briefly introduces the accompanying drawings required for describing the embodiments.

DESCRIPTION OF EMBODIMENTS

The following clearly describes the technical solutions in the embodiments of the present disclosure with reference to the accompanying drawings in the embodiments of the present disclosure.

Embodiment 1

Figure 1:
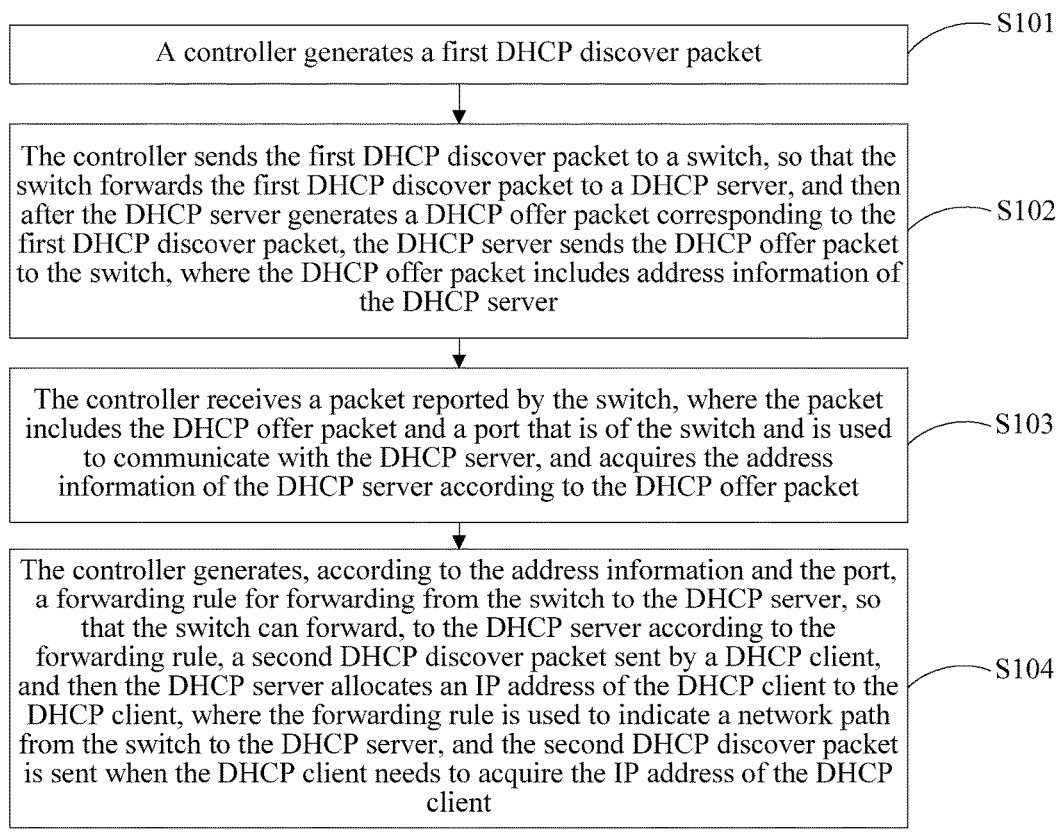
FIG. 1 is a method flowchart 1 of a method for acquiring an IP address by a DHCP client according to an embodiment of the present disclosure.

This embodiment of the present disclosure provides a method for acquiring an IP address by a DHCP client, which relates to a controller side. As shown in FIG. 1, the method includes:

S101. A controller generates a first DHCP discover packet.

The controller may actively generate the first DHCP discover packet, where the first DHCP discover packet is used to trigger a DHCP server to generate a DHCP offer packet corresponding to the first DHCP discover packet so as to acquire a location of the DHCP server in a network.

An openflow network includes a controller, a DHCP client, a DHCP server, and a switch, where the DHCP client and the DHCP server perform, under the control of the controller, data packet transmission through the switch.

Separation of a data packet forwarding layer and a data packet control layer is implemented in the openflow network. In the openflow network, a process of forwarding a data packet is completed by the switch and the controller together, where the switch is mainly responsible for forwarding the data packet, and the controller is mainly responsible for determining a forwarding rule of the data packet. After receiving the data packet, the switch first queries whether a forwarding flow table stored in the switch includes the forwarding rule of the received data packet. If a matched forwarding rule is not found, the switch forwards the data packet to the controller; and the controller determines the forwarding rule of the data packet, and delivers the forwarding rule of the data packet to a relevant switch. That is, the controller implements centralized control on the entire network by controlling the forwarding flow table in the switch.

It should be noted that the forwarding flow table is an important part of the switch, and the forwarding flow table may be used to indicate a port through which the switch forwards the received data packet. A forwarding flow table stored in each switch includes multiple forwarding flow entries, and each forwarding flow entry is one forwarding rule. The switch forwards the received data packet according to a matched forwarding rule.

Further, the forwarding rule includes a match field, a counter, and an operation instruction. The match field is an identifier of the forwarding rule; the counter is used to count a quantity of packets that match the forwarding rule; and the operation instruction is used to indicate an operation that should be performed on a data packet matching the forwarding rule. The match field includes information such as a target port, a source MAC address, a destination MAC address, a source IP address, and a destination IP address that are for forwarding the data packet.

For example, if a DHCP client needs to send a data packet to another DHCP client, after the switch receives the data packet from the DHCP client, the switch searches a forwarding flow table for a matched forwarding rule according to information such as a MAC address of the DHCP client, an IP address of the DHCP client, a MAC address of the another DHCP client, and an IP address of the another DHCP client that are carried in the data packet. If the matched forwarding rule is found, the switch performs an operation on the data packet according to an operation instruction in the forwarding rule, for example, forwards or discards the data packet, that is, if the operation instruction in the forwarding rule allows the switch to forward the data packet, the switch may forward, according to the forwarding rule, the data packet to a target port indicated in the forwarding rule.

A person of ordinary skill in the art may understand that, the controller in the openflow network may generate, according to information such as address information of the DHCP server and a port that is of the switch and is used to communicate with the DHCP server, a forwarding rule for forwarding from the switch to the DHCP server, that is, a network path from the switch to the DHCP server. A specific method for generating a forwarding rule by a controller belongs to the prior art, and details are not described herein.

S102. The controller sends the first DHCP discover packet to a switch so that the switch forwards the first DHCP discover packet to a DHCP server, and then after the DHCP server generates a DHCP offer packet corresponding to the first DHCP discover packet, the DHCP server sends the DHCP offer packet to the switch, where the DHCP offer packet includes address information of the DHCP server.

The controller sends the generated first DHCP discover packet to the switch in the openflow network. After receiving the first DHCP discover packet generated by the controller, the switch forwards the first DHCP discover packet to the DHCP server so that the DHCP server receives the first DHCP discover packet, generates the corresponding DHCP offer packet according to the first DHCP discover packet, and returns the DHCP offer packet to the switch so that the switch forwards the DHCP offer packet to the controller.

The DHCP offer packet may include the address information of the DHCP server.

Particularly, the foregoing controller and switch may be the controller and the switch in the openflow network.

S103. The controller receives a packet reported by the switch, where the packet includes the DHCP offer packet and a port that is of the switch and is used to communicate with the DHCP server, and acquires the address information of the DHCP server according to the DHCP offer packet.

After the controller receives the packet reported by the switch, where the packet includes the DHCP offer packet and the port that is of the switch and is used to communicate with the DHCP server, the controller acquires the address information of the DHCP server according to the DHCP offer packet.

S104. The controller generates, according to the address information and the port, a forwarding rule for forwarding from the switch to the DHCP server so that the switch can forward, to the DHCP server according to the forwarding rule, a second DHCP discover packet sent by the DHCP client, and then the DHCP server allocates an IP address of the DHCP client to the DHCP client, where the forwarding rule is used to indicate a network path from the switch to the DHCP server, and the second DHCP discover packet is sent when the DHCP client needs to acquire the IP address of the DHCP client.

If a DHCP client needs to acquire an IP address of the DHCP client, the controller may generate, directly according to the foregoing acquired information such as the address information of the DHCP server and the port, a forwarding rule for forwarding from the switch to the DHCP server, where the forwarding rule is used to indicate a network path from the switch to the DHCP server, that is, a network path for the DHCP client to acquire the IP address of the DHCP client from the DHCP server so that the switch forwards, to the DHCP server according to the network path indicated by the forwarding rule, a second DHCP discover packet that is sent by the DHCP client and is used to acquire the IP address of the DHCP client so as to obtain the IP address of the DHCP client allocated by the DHCP server to the DHCP client. In this way, in the prior art, a problem that in a network, a DHCP discover packet sent by a DHCP client floods because a controller processes, in a broadcasting manner, the DHCP discover packet sent by the DHCP client, or a problem that maintenance is inconvenient because information such as an address of a DHCP server is manually pre-configured on the controller is avoided.

It should be noted that the forwarding rule for forwarding from the switch to the DHCP server generated by the controller according to the foregoing acquired information such as the address information of the DHCP server and the port that is of the switch and is used to communicate with the DHCP server may include a MAC address of the switch, an IP address of the switch, a MAC address of the DHCP server, an IP address of the DHCP server, the port that is of the switch and is used to communicate with the DHCP server, and an operation instruction for instructing the switch to forward a data packet.

Further, a manner of forwarding the second DHCP discover packet by the DHCP client may be broadcasting, or may be multicasting, or may be any other sending manner meeting a requirement, which is not limited in the present disclosure.

Figure 2:
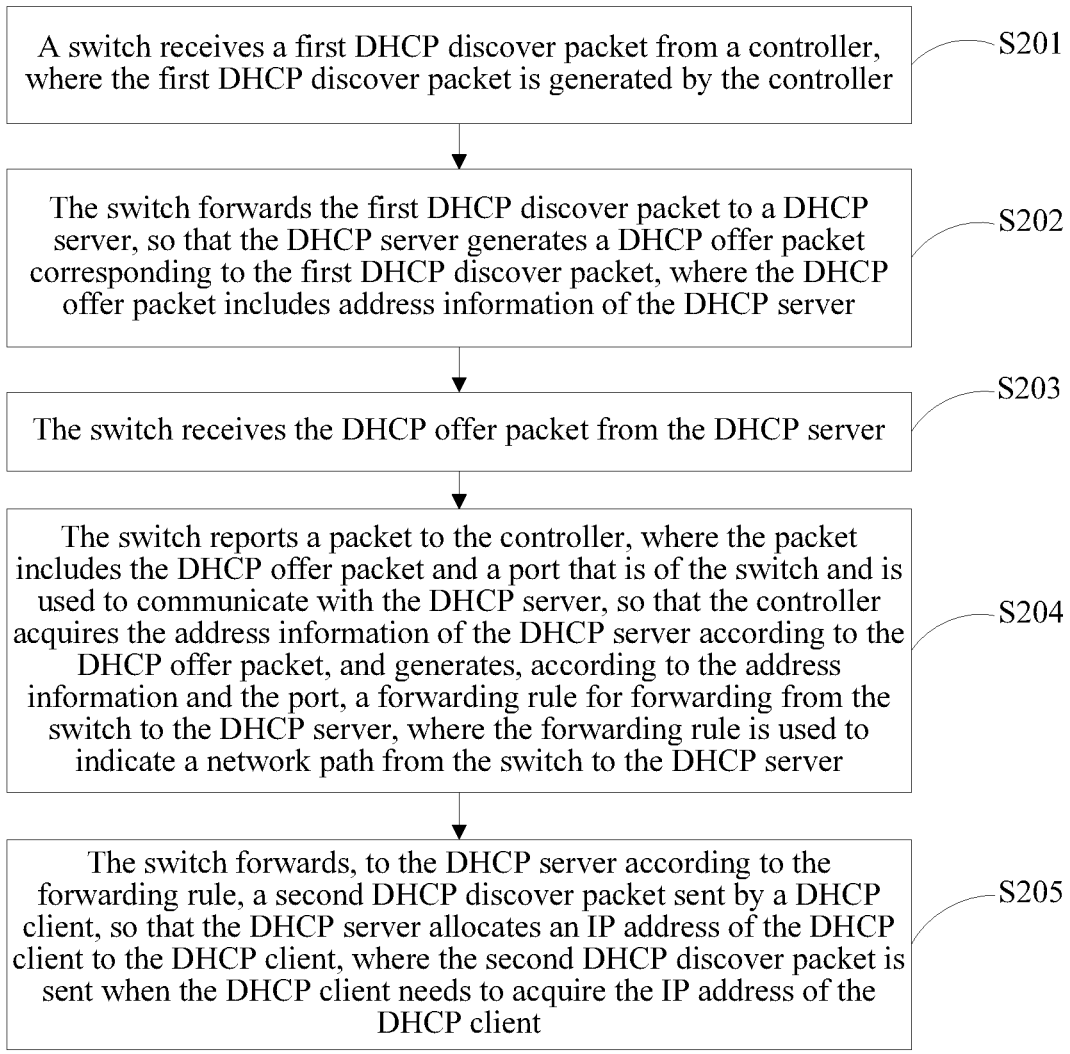
FIG. 2 is a method flowchart 2 of a method for acquiring an IP address by a DHCP client according to an embodiment of the present disclosure.

This embodiment of the present disclosure further provides a method for acquiring an IP address by a DHCP client, which relates to a switch side. As shown in FIG. 2, the method includes:

S201. A switch receives a first DHCP discover packet from a controller, where the first DHCP discover packet is generated by the controller.

After actively generating the first DHCP discover packet, the controller sends the first DHCP discover packet to the switch, that is, the switch receives the first DHCP discover packet from the controller.

S202. The switch forwards the first DHCP discover packet to a DHCP server so that the DHCP server generates a DHCP offer packet corresponding to the first DHCP discover packet, where the DHCP offer packet includes address information of the DHCP server.

After receiving the first DHCP discover packet, the switch forwards the first DHCP discover packet to the DHCP server so that the DHCP server generates the DHCP offer packet corresponding to the first DHCP discover packet, where the DHCP offer packet may include the address information of the DHCP server.

S203. The switch receives the DHCP offer packet from the DHCP server.

After the DHCP server generates the DHCP offer packet, the DHCP server sends the DHCP offer packet to the switch.

S204. The switch reports a packet to the controller, where the packet includes the DHCP offer packet and a port that is of the switch and is used to communicate with the DHCP server so that the controller acquires the address information of the DHCP server according to the DHCP offer packet, and generates, according to the address information and the port, a forwarding rule for forwarding from the switch to the DHCP server, where the forwarding rule is used to indicate a network path from the switch to the DHCP server.

After the switch receives the DHCP offer packet from the DHCP server, the switch reports the packet to the controller, where the packet includes the DHCP offer packet and the port that is of the switch and is used to communicate with the DHCP server so that the controller may acquire the address information of the DHCP server according to the DHCP offer packet. Then, if a DHCP client needs to acquire an IP address of the DHCP client, the controller may generate the forwarding rule for forwarding from the switch to the DHCP server according to the address information and the port, and send the forwarding rule to the switch, where the forwarding rule is used to indicate the network path from the switch to the DHCP server.

S205. The switch forwards, to the DHCP server according to the forwarding rule, a second DHCP discover packet sent by the DHCP client so that the DHCP server allocates an IP address of the DHCP client to the DHCP client, where the second DHCP discover packet is sent when the DHCP client needs to acquire the IP address of the DHCP client.

If a DHCP client needs to acquire an IP address of the DHCP client, the switch may forward, to the DHCP server directly according to the forwarding rule for forwarding from the switch to the DHCP server, the second DHCP discover packet sent by the DHCP client, where the forwarding rule is delivered by the controller so that the DHCP server allocates the IP address of the DHCP client to the DHCP client, where the second DHCP discover packet is sent when the DHCP client needs to acquire the IP address of the DHCP client.

According to the method for acquiring an IP address by a DHCP client provided in this embodiment of the present disclosure, a controller generates a first DHCP discover packet, and forwards the first DHCP discover packet to a DHCP server through a switch so that after the DHCP server generates a DHCP offer packet corresponding to the first DHCP discover packet and sends the DHCP offer packet to the switch, the controller receives a packet reported by the switch, where the packet includes the DHCP offer packet and a port that is of the switch and is used to communicate with the DHCP server; the controller acquires address information of the DHCP server according to the DHCP offer packet, where the DHCP offer packet includes the address information of the DHCP server; the controller generates, according to the address information and the port, a forwarding rule for forwarding from the switch to the DHCP server so that the switch can forward, to the DHCP server according to the forwarding rule, a second DHCP discover packet sent by the DHCP client, and then the DHCP server allocates an IP address of the DHCP client to the DHCP client. By using this solution, the controller actively acquires information such as the address information of the DHCP server and the port that is of the switch and is used to communicate with the DHCP server. Therefore, if a DHCP client in a network needs to acquire an IP address of the DHCP client from the DHCP server, the controller may generate, directly according to the foregoing acquired information such as the address information of the DHCP server and the port that is of the switch and is used to communicate with the DHCP server, a forwarding rule that is used to indicate a network path from the switch to the DHCP server. In this way, the DHCP client can acquire the IP address of the DHCP client from the DHCP server through the switch, which avoids a problem in the prior art that a controller assists, in a form of broadcasting, a DHCP client in acquiring an IP address of the DHCP client, or information such as an address of a DHCP server needs to be manually preconfigured on the controller; saves network bandwidth; improves network efficiency; and facilitates people's maintenance.

Embodiment 2

Figure 3:
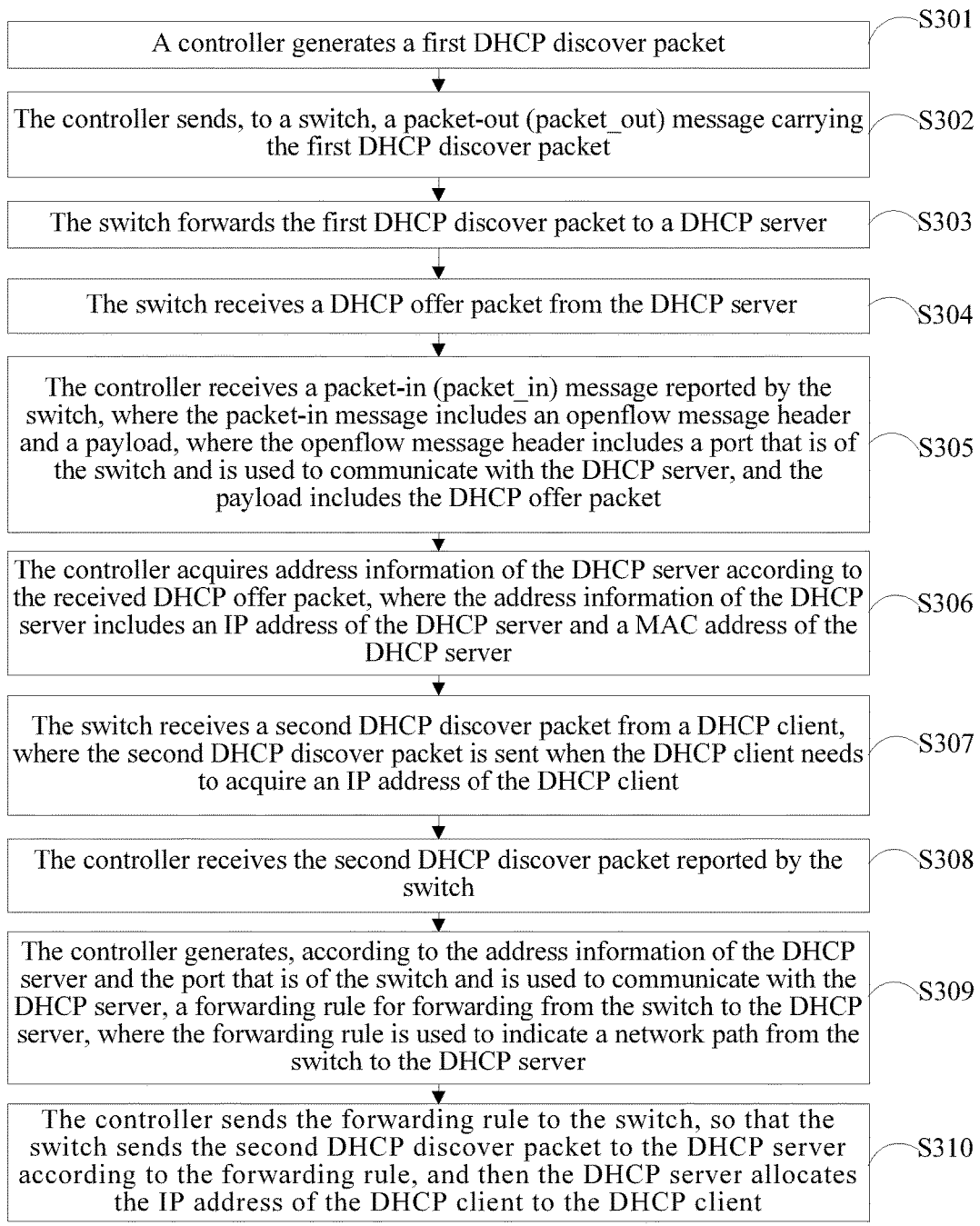
FIG. 3 is a method flowchart 3 of a method for acquiring an IP address by a DHCP client according to an embodiment of the present disclosure.

This embodiment of the present disclosure provides a method for acquiring an IP address by a DHCP client. As shown in FIG. 3, the method includes:

S301. A controller generates a first DHCP discover packet.

Separation of a data packet forwarding layer and a data packet control layer is implemented in an openflow network. In the openflow network, a process of forwarding a data packet is completed by a switch and a controller together, where the switch is mainly responsible for forwarding the data packet, and the controller is mainly responsible for determining a forwarding rule of the data packet. After receiving the data packet, the switch first queries whether a forwarding flow table stored in the switch includes the forwarding rule of the received data packet. If a matched forwarding rule is not found, the switch forwards the data packet to the controller, and the controller determines the forwarding rule of the data packet, and delivers the forwarding rule of the data packet to a relevant switch. That is, the controller implements centralized control on the entire network by controlling the forwarding flow table in the switch.

It should be noted that the forwarding flow table is an important part of the switch, and the forwarding flow table may be used to indicate a port through which the switch forwards the received data packet. A forwarding flow table stored in each switch includes multiple forwarding flow entries, and each forwarding flow entry is one forwarding rule. The switch forwards the received data packet according to a matched forwarding rule.

Further, the forwarding rule includes a match field, a counter, and an operation instruction. The match field is an identifier of the forwarding rule, the counter is used to collect statistical data of the forwarding rule, and the operation instruction is used to indicate an operation that should be performed on a data packet matching the forwarding rule. The match field includes information such as a target port, a source MAC address, a destination MAC address, a source IP address, and a destination IP address that are for forwarding the data packet.

For example, if a DHCP client needs to send a data packet to another DHCP client, after the switch receives the data packet from the DHCP client, the switch searches a forwarding flow table for a matched forwarding rule according to information such as a MAC address of the DHCP client, an IP address of the DHCP client, a MAC address of the another DHCP client, and an IP address of the another DHCP client that are carried in the data packet. If the matched forwarding rule is found, the switch performs an operation on the data packet according to an operation instruction in the forwarding rule, for example, forwards or discards the data packet, that is, if the operation instruction in the forwarding rule allows the switch to forward the data packet, the switch may forward, according to the forwarding rule, the data packet to a target port indicated in the forwarding rule.

A person of ordinary skill in the art may understand that, the controller in the openflow network may generate, according to information such as address information of a DHCP server and a port that is of the switch and is used to communicate with the DHCP server, a forwarding rule for forwarding from the switch to the DHCP server, that is, a network path from the switch to the DHCP server. A specific method for generating a forwarding rule by a controller belong to the prior art, and details are not described herein.

The controller may actively generate the first DHCP discover packet so as to acquire the information such as the address information of the DHCP server and the port that is of the switch and is used to communicate with the DHCP server, where the address information of the DHCP server may include an IP address of the DHCP server and a MAC address of the DHCP server.

The foregoing first DHCP discover packet may include a MAC address of the controller, an IP address of the controller, a broadcast MAC address, a broadcast IP address, and a bootstrap protocol, where the bootstrap protocol may include a User Datagram Protocol (UDP) and a DHCP.

S302. The controller sends, to a switch, a packet-out (packet_out) message carrying the first DHCP discover packet.

After the controller generates the first DHCP discover packet, the controller uses a packet-out message in the openflow network to send the first DHCP discover packet (that is, the packet-out message carries the first DHCP discover packet) to the switch.

A person of ordinary skill in the art may understand that in this embodiment of the present disclosure, when using the packet-out message to forward the first DHCP discover packet to the DHCP server, the switch may perform the forwarding through a port of the switch, where the port of the switch may include a link connection port between non-switches, or may include a link connection port between non-switches and a link connection port between switches.

It should be noted that, to prevent the first DHCP discover packet from entering a link between switches and being forwarded in a loop when the switch forwards the first DHCP discover packet, not all ports of the foregoing switch can be a link connection port between switches.

The packet-out message is an instruction message in the openflow network. When sending a data packet, the controller may use the packet-out message in the openflow network as a carrier of the data packet, that is, the data packet is carried in the packet-out message and sent to the switch.

In this embodiment of the present disclosure, the controller in the openflow network sends the first DHCP discover packet to the switch in the network by carrying the first DHCP discover packet in the packet-out message so that the switch forwards the first DHCP discover packet to a target port according to the packet-out message.

Particularly, the foregoing controller and switch may be the controller and the switch in the openflow network.

S303. The switch forwards the first DHCP discover packet to a DHCP server.

After the switch receives the packet-out message that carries the first DHCP discover packet and is from the controller, the switch forwards the first DHCP discover packet to the DHCP server according to the packet-out message so that after the DHCP server receives the first DHCP discover packet from the switch, the DHCP server generates, according to the first DHCP discover packet, a DHCP offer packet corresponding to the first DHCP discover packet, and sends the DHCP offer packet to the switch, where the packet-out message may be used to instruct the switch to forward the first DHCP discover packet to the DHCP server, and the DHCP offer packet may include address information of the DHCP server.

S304. The switch receives the DHCP offer packet from the DHCP server.

The switch receives the DHCP offer packet from the DHCP server, where the DHCP offer packet may include an IP address of the DHCP server and a MAC address of the DHCP server.

S305. The controller receives a packet-in (packet_in) message reported by the switch, where the packet-in message includes an openflow message header and a payload, where the openflow message header includes the port that is of the switch and is used to communicate with the DHCP server, and the payload includes the DHCP offer packet.

After the switch receives the DHCP offer packet from the DHCP server, the switch forwards the DHCP offer packet to the controller according to the packet-in message, that is, the controller receives a packet reported by the switch, where the packet includes the DHCP offer packet and the port that is of the switch and is used to communicate with the DHCP server.

The packet-in message is an instruction message in the openflow network. When the switch sends a data packet to the controller, the switch may use the packet-in message in the openflow network as a carrier of the data packet, that is, the data packet is carried in the packet-in message and sent to the controller.

S306. The controller acquires the address information of the DHCP server according to the received DHCP offer packet, where the address information of the DHCP server includes the IP address of the DHCP server and the MAC address of the DHCP server.

The controller acquires, according to the received DHCP offer packet reported by the switch, the address information of the DHCP server, that is, the IP address of the DHCP server and the MAC address of the DHCP server so that if a DHCP client needs to acquire an IP address of the DHCP client, the controller may generate, directly according to the foregoing acquired information such as the address information of the DHCP server and the port that is of the switch and is used to communicate with the DHCP server, the forwarding rule for forwarding from the switch to the DHCP server, where the forwarding rule is used to indicate the network path from the switch to the DHCP server.

It should be noted that the forwarding rule for forwarding from the switch to the DHCP server generated by the controller according to the foregoing acquired information such as the address information of the DHCP server and the port that is of the switch and is used to communicate with the DHCP server may include a MAC address of the switch, an IP address of the switch, a MAC address of the DHCP server, an IP address of the DHCP server, the port that is of the switch and is used to communicate with the DHCP server, and an operation instruction for instructing the switch to forward a data packet.

Further, in this embodiment of the present disclosure, the controller needs to periodically perform S301-S306 so that the controller may continually update the acquired information such as the IP address of the DHCP server, the MAC address of the DHCP server, and the port that is of the switch and is used to communicate with the DHCP server, thereby avoiding a problem of a network path error caused by a change of the information such as the IP address of the DHCP server, the MAC address of the DHCP server, and the port that is of the switch and is used to communicate with the DHCP server (for example, the foregoing information changes with a change of a location of the DHCP server).

It may be understood that, that the foregoing controller periodically performs S301-S306 may be as follows. The controller continually repeats S301-S306 according to a preset time, where the preset time may be any time meeting a requirement, for example, may be one minute, may be three minutes, or may be five minutes, which is not limited in the present disclosure.

Particularly, during a period from a time when the controller generates a previous first DHCP discover packet to a time when the controller generates a next first DHCP discover packet, the controller may complete performing S301-S306, that is, the controller may complete, for one time, a process of acquiring the information such as the IP address of the DHCP server, the MAC address of the DHCP server, and the port that is of the switch and is used to communicate with the DHCP server.

S307. The switch receives a second DHCP discover packet from the DHCP client, where the second DHCP discover packet is sent when the DHCP client needs to acquire an IP address of the DHCP client.

If the DHCP client needs to acquire the IP address of the DHCP client from the DHCP server, the DHCP client sends the second DHCP discover packet in the openflow network. After the switch receives the second DHCP discover packet sent by the DHCP client, the switch searches a forwarding flow table of the switch for a forwarding rule for forwarding from the switch to the DHCP server, and if the forwarding rule is not found, the switch reports the second DHCP discover packet to the controller.

Certainly, if the switch finds, in the forwarding flow table of the switch, the forwarding rule for forwarding from the switch to the DHCP server, the switch sends the second DHCP discover packet to the DHCP server directly according to the forwarding rule.

Particularly, the second DHCP discover packet may include a MAC address of the DHCP client, an all-zero IP address, a broadcast MAC address, a broadcast IP address, and a bootstrap protocol, where the bootstrap protocol may include a UDP and a DHCP.

Further, a manner of forwarding the second DHCP discover packet by the DHCP client may be broadcasting, or may be multicasting, or may be any other sending manner meeting a requirement, which is not limited in the present disclosure.

S308. The controller receives the second DHCP discover packet reported by the switch.

If the switch does not find the forwarding rule in the forwarding flow table of the switch, the switch reports the second DHCP discover packet to the controller, that is, the controller receives the second DHCP discover packet reported by the switch.

S309. The controller generates, according to the address information of the DHCP server and the port that is of the switch and is used to communicate with the DHCP server, the forwarding rule for forwarding from the switch to the DHCP server, where the forwarding rule is used to indicate the network path from the switch to the DHCP server.

After the controller receives the second DHCP discover packet forwarded by the switch, the controller generates, according to the information acquired in S305 and S306, such as the address information of the DHCP server and the port that is of the switch and is used to communicate with the DHCP server, the forwarding rule for forwarding from the switch to the DHCP server, where the forwarding rule is used to indicate the network path from the switch to the DHCP server.

S310. The controller sends the forwarding rule to the switch so that the switch sends the second DHCP discover packet to the DHCP server according to the forwarding rule, and then the DHCP server allocates the IP address of the DHCP client to the DHCP client.

The controller sends the generated forwarding rule to the switch so that the switch may send the second DHCP discover packet to the DHCP server according to the forwarding rule so that the DHCP server allocates the IP address of the DHCP client to the DHCP client.

It should be noted that, the controller performs S305-S307 only when a DHCP client in the openflow network needs to acquire an IP address of the DHCP client from the DHCP server so that the DHCP server may allocate the IP address of the DHCP client to the DHCP client.

In this embodiment of the present disclosure, if the controller periodically acquires the information such as the IP address of the DHCP server, the MAC address of the DHCP server, and the port that is of the switch and is used to communicate with the DHCP server, once a DHCP client in the network needs to acquire an IP address of the DHCP client from the DHCP server, the controller may generate, directly according to the acquired information such as the IP address of the DHCP server, the MAC address of the DHCP server, and the port that is of the switch and is used to communicate with the DHCP server, a forwarding rule for forwarding from the switch to the DHCP server, where the forwarding rule is used to indicate a network path from the switch to the DHCP server so that the DHCP client can acquire the IP address of the DHCP client from the DHCP server through the switch. In this way, in the prior art, a problem that in a network, a DHCP discover packet sent by a DHCP client floods because a controller processes, in a broadcasting manner, the DHCP discover packet that is sent by the DHCP client and is used to acquire an IP address of the DHCP client, or a problem that maintenance is inconvenient because information such as an address of a DHCP server is manually pre-configured on the controller is avoided.

It should be note that, a method for acquiring a network path of a server provided in this embodiment of the present disclosure is also applied to "in-band" communication and "out-of-band" communication. "In-band" means that in a network, a control channel between a switch and a controller and a data channel between switches are a same physical channel, that is, the control channel transmits control information by means of the data channel. "Out-of-band" means that in a network, a control channel between a switch and a controller and a data channel between switches are different physical channels.

According to the method for acquiring an IP address by a DHCP client provided in this embodiment of the present disclosure, a controller generates a first DHCP discover packet, and forwards the first DHCP discover packet to a DHCP server through a switch so that after the DHCP server generates a DHCP offer packet corresponding to the first DHCP discover packet and sends the DHCP offer packet to the switch, the controller receives a packet reported by the switch, where the packet includes the DHCP offer packet and a port that is of the switch and is used to communicate with the DHCP server; the controller acquires address information of the DHCP server according to the DHCP offer packet, where the DHCP offer packet includes the address information of the DHCP server; the controller generates, according to the address information and the port, a forwarding rule for forwarding from the switch to the DHCP server so that the switch can forward, to the DHCP server according to the forwarding rule, a second DHCP discover packet sent by the DHCP client, and then the DHCP server allocates an IP address of the DHCP client to the DHCP client. By using this solution, the controller actively acquires information such as the address information of the DHCP server and the port that is of the switch and is used to communicate with the DHCP server. Therefore, if a DHCP client in a network needs to acquire an IP address of the DHCP client from the DHCP server, the controller may generate, directly according to the foregoing acquired information such as the address information of the DHCP server and the port that is of the switch and is used to communicate with the DHCP server, a forwarding rule that is used to indicate a network path from the switch to the DHCP server. In this way, the DHCP client can acquire the IP address of the DHCP client from the DHCP server through the switch, which avoids a problem in the prior art that a controller assists, in a form of broadcasting, a DHCP client in acquiring an IP address of the DHCP client, or information such as an address of a DHCP server needs to be manually pre-configured on the controller; saves network bandwidth, improves network efficiency, and facilitates people's maintenance.

Embodiment 3

Figure 4:
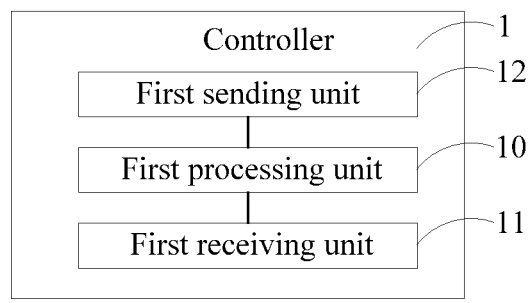
FIG. 4 is a schematic structural diagram 1 of a controller according to an embodiment of the present disclosure.

As shown in FIG. 4, this embodiment of the present disclosure provides a controller 1, including a first processing unit 10 configured to generate a first DHCP discover packet, a first sending unit 12 configured to send the first DHCP discover packet to a switch so that the switch forwards the first DHCP discover packet to a DHCP server, and then after the DHCP server generates a DHCP offer packet corresponding to the first DHCP discover packet, the DHCP server sends the DHCP offer packet to the switch, where the DHCP offer packet includes address information of the DHCP server, and a first receiving unit 11 configured to receive a packet reported by the switch, where the packet includes the DHCP offer packet and a port that is of the switch and is used to communicate with the DHCP server.

The first processing unit 10 is further configured to acquire the address information of the DHCP server according to the DHCP offer packet, and generate, according to the address information and the port, a forwarding rule for forwarding from the switch to the DHCP server so that the switch can forward, to the DHCP server according to the forwarding rule, a second DHCP discover packet sent by a DHCP client, and then the DHCP server allocates an IP address of the DHCP client to the DHCP client, where the forwarding rule is used to indicate a network path from the switch to the DHCP server, and the second DHCP discover packet is sent when the DHCP client needs to acquire the IP address of the DHCP client.

The first DHCP discover packet may include a MAC address of the controller, an IP address of the controller, a broadcast MAC address, a broadcast IP address, and a bootstrap protocol, where the bootstrap protocol may include a UDP and a DHCP.

The second DHCP discover packet may include a MAC address of the DHCP client, an all-zero IP address, a broadcast MAC address, a broadcast IP address, and a bootstrap protocol, where the bootstrap protocol may include a UDP and a DHCP.

Further, the first receiving unit 11 is further configured to receive the second DHCP discover packet reported by the switch.

The first processing unit 10 is further configured to generate the forwarding rule according to the address information of the DHCP server and the port.

The first sending unit 12 is further configured to send the forwarding rule to the switch so that the switch forwards the second DHCP discover packet to the DHCP server according to the forwarding rule, and then the DHCP server allocates the IP address of the DHCP client to the DHCP client.

Further, the controller 1 and the switch may be a controller and a switch in an openflow network.

Further, the first sending unit 12 is configured to send, to the switch, a packet-out message carrying the first DHCP discover packet so that the switch forwards the first DHCP discover packet to the DHCP server according to the packet-out message, where the packet-out message is used to instruct the switch to forward the first DHCP discover packet to the DHCP server.

Further, the first receiving unit 11 is configured to receive a packet-in message reported by the switch, where the packet-in message includes an openflow message header and a payload, where the openflow message header includes the port and the payload includes the DHCP offer packet.

Further, the address information of the DHCP server may include an IP address of the DHCP server and a MAC address of the DHCP server.

Further, the first processing unit 10 is configured to acquire the IP address of the DHCP server and the MAC address of the DHCP server according to the DHCP offer packet.

According to the controller provided in this embodiment of the present disclosure, the controller first actively generates a first DHCP discover packet, and forwards the first DHCP discover packet to a DHCP server through a switch so that after the DHCP server generates a DHCP offer packet corresponding to the first DHCP discover packet and sends the DHCP offer packet to the switch, the controller receives a packet reported by the switch, where the packet includes the DHCP offer packet and a port that is of the switch and is used to communicate with the DHCP server; the controller acquires address information of the DHCP server according to the DHCP offer packet, where the DHCP offer packet includes the address information of the DHCP server; and the controller generates, according to the address information and the port, a forwarding rule for forwarding from the switch to the DHCP server so that the switch can forward, to the DHCP server according to the forwarding rule, a second DHCP discover packet sent by a DHCP client, and then the DHCP server allocates an IP address of the DHCP client to the DHCP client. By using this solution, the controller actively acquires information such as the address information of the DHCP server and the port that is of the switch and is used to communicate with the DHCP server. Therefore, if a DHCP client in a network needs to acquire an IP address of the DHCP client from the DHCP server, the controller may generate, directly according to the foregoing acquired information such as the address information of the DHCP server and the port that is of the switch and is used to communicate with the DHCP server, a forwarding rule that is used to indicate a network path from the switch to the DHCP server. In this way, the DHCP client can acquire the IP address of the DHCP client from the DHCP server through the switch, which avoids a problem in the prior art that a controller assists, in a form of broadcasting, a DHCP client in acquiring an IP address of the DHCP client, or information such as an address of a DHCP server needs to be manually pre-configured on the controller; saves network bandwidth; improves network efficiency; and facilitates people's maintenance.

Figure 5:
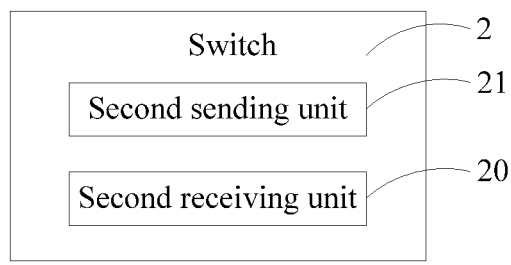
FIG. 5 is a schematic structural diagram 1 of a switch according to an embodiment of the present disclosure.

As shown in FIG. 5, this embodiment of the present disclosure provides a switch 2, including a second receiving unit 20 configured to receive a first DHCP discover packet from a controller, where the first DHCP discover packet is generated by the controller, and a second sending unit 21 configured to forward the first DHCP discover packet to a DHCP server so that the DHCP server generates a DHCP offer packet corresponding to the first DHCP discover packet, where the DHCP offer packet includes address information of the DHCP server.

The second receiving unit 20 is further configured to receive the DHCP offer packet from the DHCP server.

The second sending unit 21 is further configured to report a packet to the controller, where the packet includes the DHCP offer packet and a port that is of the switch and is used to communicate with the DHCP server so that the controller acquires the address information of the DHCP server according to the DHCP offer packet, and generates, according to the address information and the port, a forwarding rule for forwarding from the switch to the DHCP server, where the forwarding rule is used to indicate a network path from the switch to the DHCP server.

The second sending unit 21 is further configured to forward, to the DHCP server according to the forwarding rule, a second DHCP discover packet sent by a DHCP client so that the DHCP server allocates an IP address of the DHCP client to the DHCP client, where the second DHCP discover packet is sent when the DHCP client needs to acquire the IP address of the DHCP client.

Further, the second receiving unit 20 is configured to receive the second DHCP discover packet from the DHCP client.

The second sending unit 21 is further configured to report the second DHCP discover packet to the controller so that the controller generates the forwarding rule according to the address information of the DHCP server and the port.

The second receiving unit 20 is further configured to receive the forwarding rule for forwarding from the controller.

The second sending unit 21 is further configured to forward the second DHCP discover packet to the DHCP server according to the forwarding rule so that the DHCP server allocates the IP address of the DHCP client to the DHCP client.

Further, the controller and the switch 2 may be a controller and a switch in an openflow network.

Further, the second receiving unit 20 is configured to receive a packet-out message that carries the first DHCP discover packet and is from the controller, where the packet-out message is used to instruct the switch to forward the first DHCP discover packet to the DHCP server.

The second sending unit 21 is configured to forward the first DHCP discover packet to the DHCP server according to the packet-out message.

Further, the second sending unit 21 is configured to report a packet-in message to the controller, where the packet-in message includes an openflow message header and a payload, where the openflow header includes the port and the payload includes the DHCP offer packet.

Further, the address information of the DHCP server may include an IP address of the DHCP server and a MAC address of the DHCP server.

According to the switch provided in this embodiment of the present disclosure, the switch forwards a first DHCP discover packet that is actively generated by a controller to a DHCP server so that after the DHCP server generates a DHCP offer packet corresponding to the first DHCP discover packet and sends the DHCP offer packet to the switch, the switch reports a packet to the controller, where the packet includes the DHCP offer packet and a port that is of the switch and is used to communicate with the DHCP server so that the controller acquires address information of the DHCP server according to the DHCP offer packet, and generates, according to the address information and the port, a forwarding rule for forwarding from the switch to the DHCP server, where the DHCP offer packet includes the address information of the DHCP server. In this way, the switch forwards, to the DHCP server according to the forwarding rule, a second DHCP discover packet sent by a DHCP client so that the DHCP server allocates an IP address of the DHCP client to the DHCP client. By using this solution, the controller actively acquires information such as the address information of the DHCP server and the port that is of the switch and is used to communicate with the DHCP server. Therefore, if a DHCP client in a network needs to acquire an IP address of the DHCP client from the DHCP server, the controller may generate, directly according to the foregoing acquired information such as the address information of the DHCP server and the port that is of the switch and is used to communicate with the DHCP server, a forwarding rule that is used to indicate a network path from the switch to the DHCP server. In this way, the DHCP client can acquire the IP address of the DHCP client from the DHCP server through the switch, which avoids a problem in the prior art that a controller assists, in a form of broadcasting, a DHCP client in acquiring an IP address of the DHCP client, or information such as an address of a DHCP server needs to be manually pre-configured on the controller; saves network bandwidth; improves network efficiency; and facilitates people's maintenance.

Embodiment 4

Figure 6:
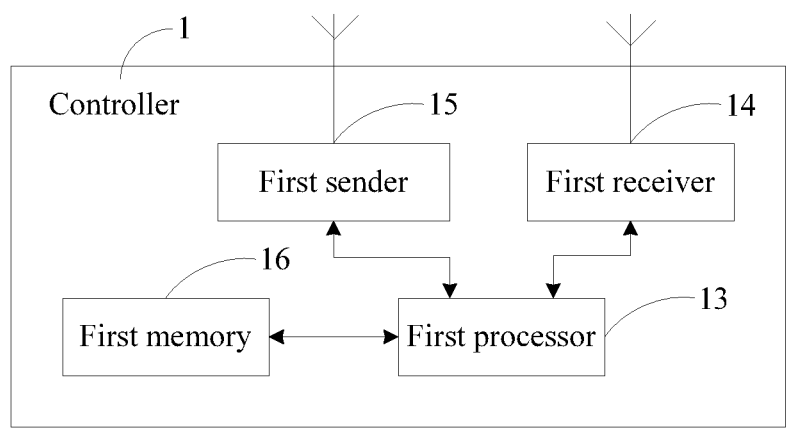
FIG. 6 is a schematic structural diagram 2 of a controller according to an embodiment of the present disclosure.

As shown in FIG. 6, this embodiment of the present disclosure provides a controller 1, including a first processor 13, a first receiver 14, a first sender 15, and a first memory 16.

The first processor 13 is a control and processing center of the controller 1, and runs a software program stored in the first memory 16 and invokes and processes data stored in the first memory 16, to control the controller 1 to send and receive a signal and implement another function of the controller 1.

The first sender 15 may be configured to send a signal to another device in a network. Particularly, if a switch in the network needs to receive information from the controller 1, the first sender 15 may send the information to the switch in the network.

The first receiver 14 may be configured to receive a signal from another device in the network. Particularly, if the switch in the network needs to send information to the controller 1, the first receiver 14 may receive the information from the switch in the network.

The first memory 16 may be configured to store a software program and data so that the first processor 13 may run the software program stored in the first memory 16, to implement a function of sending and receiving a signal and another function of the controller 1.

In this embodiment of the present disclosure, the first processor 13 generates a first DHCP discover packet, and stores the first DHCP discover packet into the first memory 16; the first processor 13 instructs the first sender 15 to send the first DHCP discover packet to a switch so that the switch forwards the first DHCP discover packet to a DHCP server; and then after the DHCP server generates a DHCP offer packet corresponding to the first DHCP discover packet, the DHCP server sends the DHCP offer packet to the switch, where the DHCP offer packet includes address information of the DHCP server; and after the first receiver 14 receives a packet reported by the switch, where the packet includes the DHCP offer packet and a port that is of the switch and is used to communicate with the DHCP server, the first processor 13 processes the DHCP offer packet, and then, the first processor 13 acquires the address information of the DHCP server according to the DHCP offer packet in the first memory 16 and stores the address information and the port that is of the switch and is used to communicate with the DHCP server into the first memory 16. If a DHCP client needs to acquire an IP address of the DHCP client from the DHCP server, the DHCP client sends a second DHCP discover packet to the switch; after the switch receives the second DHCP discover packet, the switch searches a forwarding flow table of the switch for a forwarding rule for forwarding from the switch to the DHCP server; if the forwarding rule is not found, the switch reports the second DHCP discover packet to the controller 1, that is, the first receiver 14 receives the second DHCP discover packet reported by the switch; and then, the first processor 13 invokes the address information of the DHCP server and the port that is of the switch and is used to communicate with the DHCP server, where the address information of the DHCP server and the port are in the first memory 16, generates the forwarding rule according to the address information of the DHCP server and the port that is of the switch and is used to communicate with the DHCP server, and stores the forwarding rule into the first memory 16, where the forwarding rule is used to indicate a network path from the switch to the DHCP server; and the first processor 13 instructs the first sender 15 to send the forwarding rule stored in the first memory 16 to the switch so that the switch forwards the second DHCP discover packet to the DHCP server according to the forwarding rule, and then the DHCP server allocates the IP address of the DHCP client to the DHCP client.

The first DHCP discover packet may include a MAC address of the controller, an IP address of the controller, a broadcast MAC address, a broadcast IP address, and a bootstrap protocol, where the bootstrap protocol may include a UDP and a DHCP.

The second DHCP discover packet may include a MAC address of the DHCP client, an all-zero IP address, a broadcast MAC address, a broadcast IP address, and a bootstrap protocol, where the bootstrap protocol may include a UDP and a DHCP.

Further, the controller 1 and the switch may be a controller and a switch in an openflow network.

Further, the first sender 15 is configured to send, to the switch, a packet-out message carrying the first DHCP discover packet so that the switch forwards the first DHCP discover packet to the DHCP server according to the packet-out message, where the packet-out message is used to instruct the switch to forward the first DHCP discover packet to the DHCP server.

Further, the first receiver 14 is configured to receive a packet-in message reported by the switch, where the packet-in message includes an openflow message header and a payload, where the openflow message header includes the port that is of the switch and is used to communicate with the DHCP server, and the payload includes the DHCP offer packet.

Further, the address information of the DHCP server may include an IP address of the DHCP server and a MAC address of the DHCP server.

Further, the first processor 13 is configured to acquire the IP address of the DHCP server and the MAC address of the DHCP server according to the DHCP offer packet, and store the IP address of the DHCP server and the MAC address of the DHCP server into the first memory 16.

According to the controller provided in this embodiment of the present disclosure, the controller first actively generates a first DHCP discover packet, and forwards the first DHCP discover packet to a DHCP server through a switch so that after the DHCP server generates a DHCP offer packet corresponding to the first DHCP discover packet and sends the DHCP offer packet to the switch, the controller receives a packet reported by the switch, where the packet includes the DHCP offer packet and a port that is of the switch and is used to communicate with the DHCP server; the controller acquires address information of the DHCP server according to the DHCP offer packet, where the DHCP offer packet includes the address information of the DHCP server; and the controller generates, according to the address information and the port, a forwarding rule for forwarding from the switch to the DHCP server so that the switch can forward, to the DHCP server according to the forwarding rule, a second DHCP discover packet sent by a DHCP client, and then the DHCP server allocates an IP address of the DHCP client to the DHCP client. By using this solution, the controller actively acquires information such as the address information of the DHCP server and the port that is of the switch and is used to communicate with the DHCP server. Therefore, if a DHCP client in a network needs to acquire an IP address of the DHCP client from the DHCP server, the controller may generate, directly according to the foregoing acquired information such as the address information of the DHCP server and the port that is of the switch and is used to communicate with the DHCP server, a forwarding rule that is used to indicate a network path from the switch to the DHCP server. In this way, the DHCP client can acquire the IP address of the DHCP client from the DHCP server through the switch, which avoids a problem in the prior art that a controller assists, in a form of broadcasting, a DHCP client in acquiring an IP address of the DHCP client, or information such as an address of a DHCP server needs to be manually pre-configured on the controller; saves network bandwidth; improves network efficiency; and facilitates people's maintenance.

Figure 7:
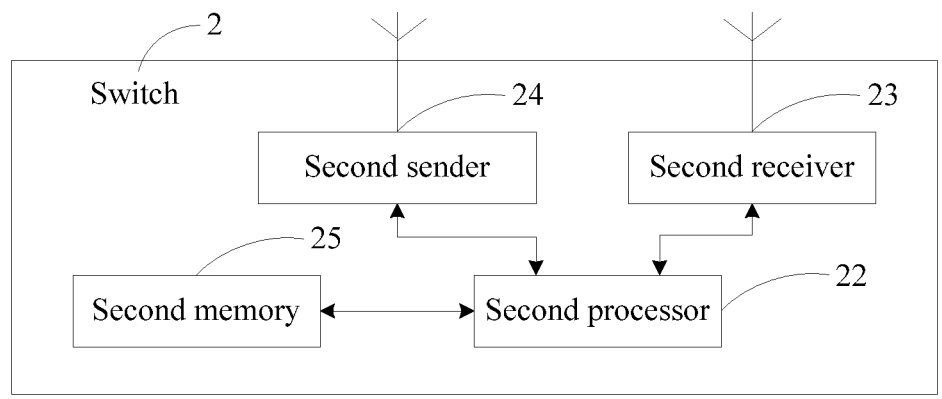
FIG. 7 is a schematic structural diagram 2 of a switch according to an embodiment of the present disclosure.

As shown in FIG. 7, this embodiment of the present disclosure provides a switch 2, including a second processor 22, a second receiver 23, a second sender 24, and a second memory 25.

The second processor 22 is a control and processing center of the switch 2, and runs a software program stored in the second memory 25 and invokes and processes data stored in the second memory 2, to control the switch 2 to send and receive a signal and implement another function of the switch 2.

The second sender 24 may be configured to send a signal to another device in a network. Particularly, if a controller in the network needs to receive information from the switch 2, the second sender 24 may send the information to the controller in the network.

The second receiver 23 may be configured to receive a signal from another device in the network. Particularly, if the controller in the network needs to send information to the switch 2, the second receiver 23 may receive the information from the controller in the network.

The second memory 25 may be configured to store a software program and data so that the second processor 22 may run the software program stored in the second memory 25, to implement a function of sending and receiving a signal and another function of the switch 2.

In this embodiment of the present disclosure, after the second receiver 23 receives a first DHCP discover packet from the controller, the second processor 22 stores the first DHCP discover packet into the second memory 25 after processing the first DHCP discover packet; and then, the second processor 22 instructs the second sender 24 to forward the first DHCP discover packet to a DHCP server so that the DHCP server generates a DHCP offer packet corresponding to the first DHCP discover packet, and sends the DHCP offer packet to the switch, that is, the second receiver 23 receives the DHCP offer packet from the DHCP server, where the DHCP offer packet includes address information of the DHCP server; and the second processor 22 stores the DHCP offer packet into the second memory 25 after processing the DHCP offer packet, and instructs the second sender 24 to report a packet to the controller, where the packet includes the DHCP offer packet and a port that is of the switch and is used to communicate with the DHCP server so that the controller acquires the address information of the DHCP server according to the DHCP offer packet, and generates, according to the address information and the port that is of the switch and is used to communicate with the DHCP server, a forwarding rule for forwarding from the switch to the DHCP server, where the forwarding rule is used to indicate a network path from the switch to the DHCP server. If a DHCP client needs to acquire an IP address of the DHCP client from the DHCP server, the DHCP client sends a second DHCP discover packet to the switch, that is, the second receiver 23 first receives the second DHCP discover packet; the second processor 22 stores the second DHCP discover packet into the second memory 25 after processing the second DHCP discover packet, and searches a forwarding flow table of the switch for the forwarding rule for forwarding from the switch to the DHCP server; if the forwarding rule is not found, the second processor 22 instructs the second sender 24 to report the second DHCP discover packet to the controller so that the controller generates the forwarding rule according to the acquired address information of the DHCP server and the port that is of the switch and is used to communicate with the DHCP server, and delivers the forwarding rule to the switch, where the forwarding rule is used to indicate a network path from the switch 2 to the DHCP server, that is, the second receiver 23 receives the forwarding rule for forwarding from the controller; and the second processor 22 stores the forwarding rule into the second memory 25, and instructs, according to the forwarding rule, the second sender 24 to forward the second DHCP discover packet to the DHCP server so that the DHCP server allocates the IP address of the DHCP client to the DHCP client.

Further, the controller and the switch may be a controller and a switch in an openflow network.

Further, the second receiver 23 is configured to receive a packet-out message that carries the first DHCP discover packet and is from the controller, where the packet-out message is used to instruct the switch to forward the first DHCP discover packet to the DHCP server.

Further, the second sender 24 is configured to forward the first DHCP discover packet to the DHCP server according to the packet-out message.

Further, the second sender 24 is configured to report a packet-in message to the controller, where the packet-in message includes an openflow message header and a payload, where the openflow message header includes the port that is of the switch and is used to communicate with the DHCP server, and the payload includes the DHCP offer packet.

Further, the address information of the DHCP server may include an IP address of the DHCP server and a MAC address of the DHCP server.

According to the switch provided in this embodiment of the present disclosure, the switch forwards a first DHCP discover packet that is actively generated by a controller to a DHCP server so that after the DHCP server generates a DHCP offer packet corresponding to the first DHCP discover packet and sends the DHCP offer packet to the switch, the switch reports a packet to the controller, where the packet includes the DHCP offer packet and a port that is of the switch and is used to communicate with the DHCP server so that the controller acquires address information of the DHCP server according to the DHCP offer packet, and generates, according to the address information and the port, a forwarding rule for forwarding from the switch to the DHCP server, where the DHCP offer packet includes the address information of the DHCP server. In this way, the switch forwards, to the DHCP server according to the forwarding rule, a second DHCP discover packet sent by a DHCP client so that the DHCP server allocates an IP address of the DHCP client to the DHCP client. By using this solution, the controller actively acquires information such as the address information of the DHCP server and the port that is of the switch and is used to communicate with the DHCP server. Therefore, if a DHCP client in a network needs to acquire an IP address of the DHCP client from the DHCP server, the controller may generate, directly according to the foregoing acquired information such as the address information of the DHCP server and the port that is of the switch and is used to communicate with the DHCP server, a forwarding rule that is used to indicate a network path from the switch to the DHCP server. In this way, the DHCP client can acquire the IP address of the DHCP client from the DHCP server through the switch, which avoids a problem in the prior art that a controller assists, in a form of broadcasting, a DHCP client in acquiring an IP address of the DHCP client, or information such as an address of a DHCP server needs to be manually pre-configured on the controller, saves network bandwidth, improves network efficiency, and facilitates people's maintenance.

Embodiment 5

Figure 8:
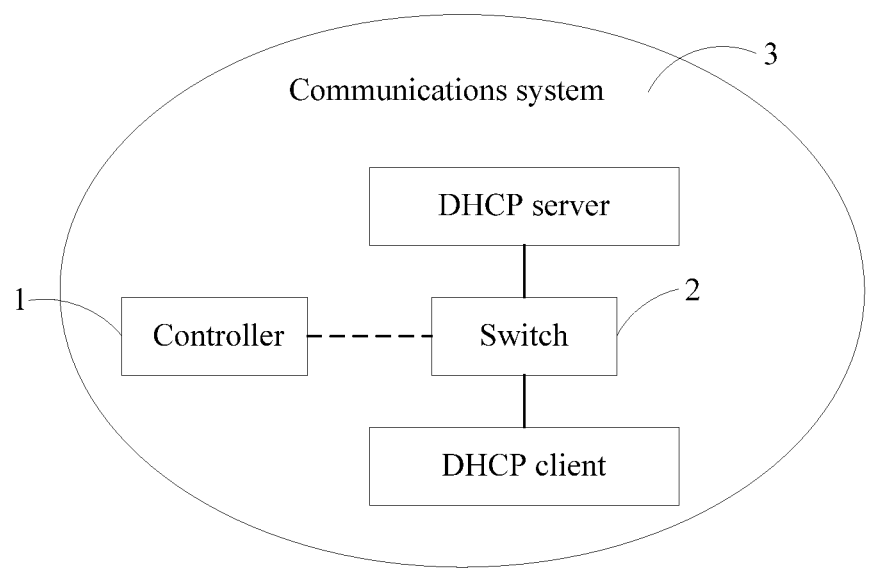
FIG. 8 is a block diagram 1 of a communications system according to an embodiment of the present disclosure.

As shown in FIG. 8, this embodiment of the present disclosure further provides a communications system 3 for acquiring an IP address by a DHCP client, including any controller 1 described above and any switch 2 described above.

Further, the communications system 3 further includes the foregoing DHCP server and DHCP client.

Figure 9:
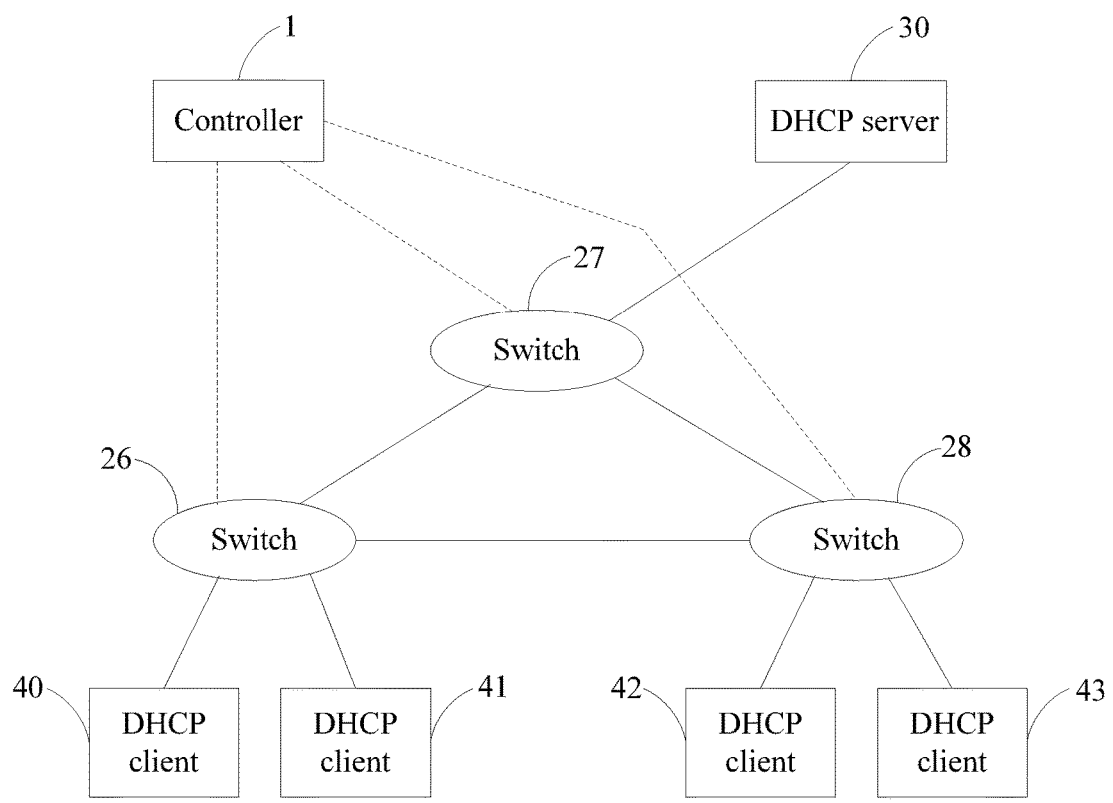
FIG. 9 is a block diagram 2 of a communications system according to an embodiment of the present disclosure.

A method for acquiring an IP address by a DHCP client provided in the embodiments of the present disclosure is applied to the foregoing communications system 3. As shown in FIG. 9, that the communications system includes one controller 1; three switches, which are a switch 26, a switch 27, and a switch 28; one DHCP server 30; and four DHCP clients, which are a DHCP client 40, a DHCP client 41, a DHCP client 42, and a DHCP client 43 is used as an example. The DHCP client 40 and the DHCP client 41 are connected to the switch 26; the DHCP client 42 and the DHCP client 43 are connected to the switch 28; the DHCP server 30 is connected to the switch 27; the controller 1 controls the entire communications system. Then, the method for acquiring an IP address of a DHCP client by the DHCP client includes:

(1) The controller 1 periodically acquires information such as an IP address of the DHCP server 30, a MAC address of the DHCP server 30, and a port that is of the switch 27 and is used to communicate with the DHCP server 30.

(2) If the DHCP client 40 needs to acquire an IP address of the DHCP client 40, the DHCP client 40 broadcasts a second DHCP discover packet.

It should be noted that the second DHCP discover packet includes a MAC address of the DHCP client, an all-zero IP address, a MAC address of a target port, an IP address of the target port, and a bootstrap protocol.

(3) After the switch 26 receives the second DHCP discover packet from the DHCP client 40, the switch 26 queries whether a forwarding flow table of the switch 26 includes a forwarding rule for forwarding from the switch 26 to the DHCP server 30, where the forwarding rule is used to indicate a network path from the switch 26 to the DHCP server 30; then, the switch 26 forwards the second DHCP discover packet to the DHCP server 30 through some ports of the switch 26.

It should be noted that some ports of the switch 26 may include a link connection port between non-switches, or may include a link connection port between non-switches and a link connection port between switches.

Particularly, to prevent the second DHCP discover packet from entering a link between switches and being forwarded in a loop when the switch forwards the second DHCP discover packet, not all ports of the foregoing switch can be a link connection port between switches.

(4) If the switch 26 does not find the forwarding rule for forwarding from the switch 26 to the DHCP server 30, the switch 26 reports the second DHCP discover packet to the controller 1.

(5) The controller 1 generates, according to the acquired information such as the IP address of the DHCP server 30, the MAC address of the DHCP server 30, and the port that is of the switch 27 and is used to communicate with the DHCP server 30, the forwarding rule that is used to indicate the network path from the switch 26 to the DHCP server 30, that is, a path for the DHCP client 40 to acquire the IP address from the DHCP server 30 (it is assumed that the network path is DHCP client 40-switch 26-switch 27-DHCP server 30).

(6) The controller 1 sends the generated forwarding rule to the switch 26 and the switch 27 according to a preset forwarding rule modification message so that the switch 26 and the switch 27 forward the second discover packet of the DHCP client to the DHCP server 30 according to the forwarding rule, and then the DHCP server 30 allocates the IP address of the DHCP client 40 to the DHCP client 40, that is, the DHCP client 40 acquires the IP address of the DHCP client 40.

The forwarding rule modification message is an instruction message in an openflow network. When sending the forwarding rule, the controller may use the preset forwarding rule modification message as a carrier of the forwarding rule, that is, the forwarding rule is carried in the forwarding rule modification message and sent to a target switch.

In the foregoing communications system, the controller 1 periodically acquires the information such as the IP address of the DHCP server 30, the MAC address of the DHCP server 30, and the port that is of the switch 27 and is used to communicate with the DHCP server 30; therefore, if the DHCP client 40 in the network needs to acquire the IP address of the DHCP client 40 from the DHCP server 30, the controller 1 may directly generate the forwarding rule that is used to indicate the network path from the switch 26 and the DHCP server 30, that is, the network path for the DHCP client 40 to acquire the IP address of the DHCP client 40 from the DHCP server 30, where the forwarding rule is used to instruct the DHCP client 40 to acquire, according to the network path indicated by the controller, the IP address of the DHCP client 40 from the DHCP server 30. In this way, in the prior art, a problem that in a network, a DHCP discover packet sent by a DHCP client floods because the controller 1 forwards, in a broadcasting manner, the DHCP discover packet sent by the DHCP client, or a problem that maintenance is inconvenient because information such as an address of the DHCP server 30 is manually pre-configured on the controller 1 is avoided.

Particularly, in a process of acquiring, by the controller 1, the information such as the IP address of the DHCP server 30, the MAC address of the DHCP server 30, and the port that is of the switch 27 and is used to communicate with the DHCP server 30, because in this case, the controller 1 has not acquired the information such as the IP address of the DHCP server 30, the MAC address of the DHCP server 30, and the port that is of the switch 27 and is used to communicate with the DHCP server 30, the controller 1 cannot generate a corresponding forwarding rule. If the DHCP client 40 needs to acquire the IP address of the DHCP client 40 in this case, a method for acquiring the IP address of the DHCP client 40 by the DHCP client 40 includes:

(1) If the DHCP client 40 needs to acquire the IP address of the DHCP client 40, the DHCP client 40 broadcasts a second DHCP discover packet.

(2) After receiving the second DHCP discover packet from the DHCP client 40, the switch 26 queries whether a forwarding flow table of the switch 26 includes a forwarding rule for forwarding from the switch 26 to the DHCP server 30, where the forwarding rule is used to instruct the switch 26 to forward the second DHCP discover packet to some ports of the switch 26, and then forward the second DHCP discover packet to the DHCP server 30.

(3) If the switch 26 does not find the forwarding rule, the switch 26 reports the second DHCP discover packet to the controller 1.

(4) Because the controller 1 does not acquire the information such the IP address of the DHCP server 30, the MAC address of the DHCP server 30, and the port that is of the switch 27 and is used to communicate with the DHCP server 30, the controller 1 can generate, only in a manner for processing an ordinary packet, a forwarding rule that is used to instruct the switch 26, the switch 27, and the switch 28 to broadcast the second DHCP discover packet.

(5) The controller 1 forwards the forwarding rule generated in step (4) to the switch 26, the switch 27, and the switch 28 according to a preset forwarding modification message so that the switch 26, the switch 27, and the switch 28 forward the second DHCP discover packet according to the forwarding rule.

(6) After receiving the second DHCP discover packet, the DHCP server 30 connected to the switch 27 returns a DHCP offer packet corresponding to the second DHCP discover packet to the switch 27. The switch 27 queries whether a forwarding flow table of the switch 27 includes a forwarding rule of the DHCP offer packet, and if the forwarding rule of the DHCP offer packet is not found, the switch 27 reports the DHCP offer packet to the controller 1 by carrying the DHCP offer packet in a packet-in message.

(7) The controller 1 acquires, according to the foregoing received packet-in message carrying the DHCP offer packet, the information such the IP address of the DHCP server 30, the MAC address of the DHCP server 30, and the port that is of the switch 27 and is used to communicate with the DHCP server 30 so as to generate a forwarding rule that is used to indicate a network path from the DHCP server 30 to the DHCP client 40 (it is assumed that the network path is DHCP server 30-switch 27-switch 26-DHCP client 40).

(8) The controller 1 sends the forwarding rule generated in step (7) to the switch 26 and the switch 27 in the network path so that the switch 26 and the switch 27 forward, according to the forwarding rule, the DHCP offer packet that is from the DHCP server 30, and then the DHCP client 40 acquires the IP address of the DHCP client 40.

It should be noted that a complete process of acquiring an IP address of a DHCP client by the DHCP client is as follows. The DHCP client broadcasts a second DHCP discover packet; after receiving the second DHCP discover packet, a DHCP server in a network returns a DHCP offer packet corresponding to the second DHCP discover packet to the DHCP client; after receiving the DHCP offer packet, the DHCP client further broadcasts a DHCP request packet; and after receiving the DHCP request packet, the DHCP server further returns a DHCP acknowledgment packet corresponding to the DHCP request packet to the DHCP client. In this way, the DHCP client acquires the IP address of the DHCP client.

It may be understood that a process of sending a second DHCP discover packet by a DHCP client is basically the same as a process of sending a DHCP request packet by the DHCP client. Correspondingly, a process of sending a DHCP offer packet by a DHCP server is also basically the same as a process of sending a DHCP acknowledgment packet by the DHCP server, and details are not described herein again.

The method for acquiring an IP address by a DHCP client provided in this embodiment of the present disclosure is applied to another communications system. When a DHCP client needs to acquire an IP address of the DHCP client, if the system includes multiple DHCP servers, a controller acquires information such as IP addresses of all DHCP servers in a network, MAC addresses of all the DHCP servers, and ports that are of switches and are used to communicate with the DHCP servers. Once a DHCP client needs to acquire an IP address of the DHCP client, the controller may allocate DHCP clients in the network to different DHCP servers (that is, allocate a DHCP client connected to a switch to a DHCP server, allocate a DHCP client connected to another switch to another DHCP server, and the like), and send, to a DHCP server to which the DHCP client is allocated, a second DHCP discover packet that is sent when the DHCP client acquires the IP address of the DHCP client so that the DHCP client acquires the IP address of the DHCP client.

It may be understood that, with the foregoing system in which the network includes multiple DHCP servers, flexibility of deployment of the DHCP servers in the network is improved.

According to the communications system provided in this embodiment of the present disclosure, a controller periodically acquires information such as an IP address of a DHCP server, a MAC address of the DHCP server, and a port that is of a switch and is used to communicate with the DHCP server; therefore, if a DHCP client needs to acquire an IP address of the DHCP client, the controller generates, according to the information such as the IP address of the DHCP server, the MAC address of the DHCP server, and the port that is of the switch and is used to communicate with the DHCP server, a forwarding rule that is used to indicate a network path from the switch to the DHCP server, that is, a network path for the DHCP client to acquire the IP address of the DHCP client so that the DHCP client acquires the IP address of the DHCP client, which avoids a problem in the prior art that a controller assists, in a form of broadcasting, a DHCP client in acquiring an IP address of the DHCP client, or information such as an address of a DHCP server needs to be manually pre-configured on the controller, saves network bandwidth, improves network efficiency, and facilitates people's maintenance.

It may be clearly understood by a person skilled in the art that, for ease and brevity of description, for a detailed working process of the foregoing system, apparatus, and unit, reference may be made to a corresponding process in the foregoing method embodiments, and details are not described herein again.

The solutions in the present disclosure may be described in the general context of executable computer instructions executed by a computer, for example, a program unit. Generally, the program unit includes a routine, program, object, component, data structure, and the like for executing a particular task or implementing a particular abstract data type. The solutions in the present disclosure may also be practiced in distributed computing environments in which tasks are performed by remote processing devices that are connected through a communications network. In a distributed computing environment, program units may be located in both local and remote computer storage media including storage devices.

The embodiments in this specification are described in a progressive manner, for same or similar parts in the embodiments, reference may be made to these embodiments, and each embodiment focuses on a difference from other embodiments. Especially, an apparatus embodiment is basically similar to a method embodiment, and therefore is described briefly; for related parts, reference may be made to partial descriptions in the method embodiment. The described apparatus embodiment is merely exemplary. The units described as separate parts may or may not be physically separate, and parts displayed as units may or may not be physical units, may be located in one position, or may be distributed on multiple network units. Some or all of the modules may be selected according to actual requirements to achieve the objectives of the solutions of the embodiments. A person of ordinary skill in the art may understand and implement the embodiments of the present disclosure without creative efforts.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that such implementation goes beyond the scope of the present disclosure.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on multiple network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to the prior art, or some of the technical solutions may be implemented in the form of a software product. The software product is stored in a storage medium, and includes several instructions for instructing a computer device (which may be a personal computer, a server, or a network device) to perform all or some of the steps of the methods described in the embodiments of the present disclosure. The foregoing storage medium includes any medium that can store program code, such as a universal serial bus (USB) flash drive, a removable hard disk, a read-only memory (ROM), a random access memory (RAM), a magnetic disk, or an optical disc.

By means of description of the foregoing embodiments, a person skilled in the art may clearly understand that the present disclosure may be implemented in a manner of computer software plus necessary universal hardware, where the universal hardware includes an integrated circuit, a universal central processing unit (CPU), a universal memory, a universal component, and the like, or certainly may be implemented by using dedicated hardware such as a dedicated integrated circuit, a dedicated CPU, a dedicated memory, and a dedicated component, but in many cases, the former is a better implementation manner. Based on such an understanding, the technical solutions of the present disclosure essentially or the part contributing to the prior art may be implemented in the form of a software product. The software product is stored in a readable storage medium, such as a floppy disk, a hard disk or an optical disc of a computer, and includes several instructions for instructing a computer device (which may be a personal computer, a server, or a network device) to perform the methods described in the embodiments of the present disclosure.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method for acquiring an Internet Protocol (IP) address by a Dynamic Host Configuration Protocol (DHCP) client, applied in a network comprising a controller and at least one switch, the method comprising:
   generating, by the controller, a first DHCP discover packet;
   sending, by the controller, the first DHCP discover packet to all switches in the network so that a switch directly connected to a DHCP server forwards the first DHCP discover packet to the DHCP server, and after the DHCP server generates a DHCP offer packet corresponding to the first DHCP discover packet, the DHCP server sends the DHCP offer packet to the switch directly connected to the DHCP server, wherein the DHCP offer packet comprises address information of the DHCP server;
   receiving, by the controller, a packet reported by the switch directly connected to the DHCP server, wherein the packet comprises the DHCP offer packet and a port of the switch directly connected to the DHCP server to communicate with the DHCP server;
   acquiring, by the controller, the address information of the DHCP server according to the DHCP offer packet;
   generating, by the controller according to the address information and the port, a forwarding rule for forwarding from a switch in a forwarding path between the DHCP client and the DHCP server to the DHCP server;
   sending, by the controller, the forwarding rule to the switch in the forwarding path between the DHCP client and the DHCP server so that the switch in the forwarding path between the DHCP client and the DHCP server forwards, to the DHCP server and according to the forwarding rule, a second DHCP discover packet from the DHCP client, and then the DHCP server allocates an IP address of the DHCP client to the DHCP client, wherein the forwarding rule is used to indicate a network path from the switch in the forwarding path between the DHCP client and the DHCP server to the DHCP server, and wherein the second DHCP discover packet is sent when the DHCP client needs to acquire the IP address of the DHCP client.

2. The method for acquiring the IP address by the DHCP client according to claim 1, wherein generating, by the controller according to the address information and the port, the forwarding rule for forwarding from the switch in the forwarding path between the DHCP client and the DHCP server to the DHCP server, and sending the forwarding rule to the switch in the forwarding path between the DHCP client and the DHCP server so that the switch in the forwarding path between the DHCP client and the DHCP server forward, to the DHCP server according to the forwarding rule, the second DHCP discover packet sent by the DHCP client, and then the DHCP server allocates the IP address of the DHCP client to the DHCP client comprises:
   receiving, by the controller, the second DHCP discover packet reported by the switch in the forwarding path between the DHCP client and the DHCP server;
   generating, by the controller, the forwarding rule according to the address information of the DHCP server and the port; and
   sending, by the controller, the forwarding rule to the switch in the forwarding path between the DHCP client and the DHCP server so that the switch in the forwarding path between the DHCP client and the DHCP server forwards the second DHCP discover packet to the DHCP server according to the forwarding rule, and then the DHCP server allocates the IP address of the DHCP client to the DHCP client.

3. The method for acquiring the IP address by the DHCP client according to claim 1, wherein the controller periodically performs the steps in claim 1 in sequence.

4. The method for acquiring the IP address by the DHCP client according to claim 3, wherein sending, by the controller, the first DHCP discover packet to all switches in the network so that the switch directly connected to the DHCP server forwards the first DHCP discover packet to the DHCP server comprises sending, by the controller to all the switches in the network, a packet-out message carrying the first DHCP discover packet so that all the switches in the network forwards the first DHCP discover packet to the DHCP server according to the packet-out message, and wherein the packet-out message is used to instruct the switch to forward the first DHCP discover packet to the DHCP server.

5. The method for acquiring the IP address by the DHCP client according to claim 3, wherein receiving, by the controller, the packet reported by the switch comprises receiving, by the controller, a packet-in message reported by the switch directly connected to the DHCP server, wherein the packet-in message comprises an openflow message header and a payload, wherein the openflow message header comprises the port, and wherein the payload comprises the DHCP offer packet.

6. The method for acquiring the IP address by the DHCP client according to claim 1, wherein the address information of the DHCP server comprises an IP address of the DHCP server and a Media Access Control (MAC) address of the DHCP server.

7. A method for acquiring an Internet Protocol (IP) address by a Dynamic Host Configuration Protocol (DHCP) client, comprising:
receiving, by a switch directly connected to a DHCP server, a first DHCP discover packet from a controller, wherein the first DHCP discover packet is generated by the controller;
forwarding, by the switch directly connected to the DHCP server, the first DHCP discover packet to the DHCP server so that the DHCP server generates a DHCP offer packet corresponding to the first DHCP discover packet, wherein the DHCP offer packet comprises address information of the DHCP server;
receiving, by the switch directly connected to the DHCP server, the DHCP offer packet from the DHCP server;
reporting, by the switch directly connected to the DHCP server, a packet to the controller, wherein the packet comprises the DHCP offer packet and a port of the switch directly connected to the DHCP server to communicate with the DHCP server so that the controller acquires the address information of the DHCP server according to the DHCP offer packet, and generates, according to the address information and the port, a forwarding rule for forwarding from the switch in a forwarding path between the DHCP client and the DHCP server to the DHCP server, wherein the forwarding rule is used to indicate a network path from the switch in the forwarding path between the DHCP client and the DHCP server to the DHCP server; and
forwarding, by the switch directly connected to the DHCP server to the DHCP server according to the forwarding rule, a second DHCP discover packet sent by the DHCP client so that the DHCP server allocates an IP address of the DHCP client to the DHCP client, wherein the second DHCP discover packet is sent when the DHCP client needs to acquire the IP address of the DHCP client.

8. The method for acquiring the IP address by the DHCP client according to claim 7, wherein forwarding, by the switch in the forwarding path between the DHCP client and the DHCP server to the DHCP server according to the forwarding rule, the second DHCP discover packet sent by the DHCP client so that the DHCP server allocates the IP address of the DHCP client to the DHCP client comprises:
receiving, by the switch in the forwarding path between the DHCP client and the DHCP server, the second DHCP discover packet from the DHCP client;
reporting, by the switch in the forwarding path between the DHCP client and the DHCP server, the second DHCP discover packet to the controller so that the controller generates the forwarding rule according to the address information of the DHCP server and the port; and
receiving, by the switch in the forwarding path between the DHCP client and the DHCP server, the forwarding rule for forwarding from the controller; and
forwarding, by the switch in the forwarding path, the second DHCP discover packet to the DHCP server according to the forwarding rule so that the DHCP server allocates the IP address of the DHCP client to the DHCP client.

9. The method for acquiring the IP address by the DHCP client according to claim 8, wherein receiving, by the switch directly connected to the DHCP server, the first DHCP discover packet from the controller, and forwarding, by the switch directly connected to the DHCP server, the first DHCP discover packet to the DHCP server comprises:
receiving, by the switch directly connected to the DHCP server, a packet-out message from the controller, wherein the packet-out message carries the first DHCP discover packet, and wherein the packet-out message is used to instruct the switch to forward the first DHCP discover packet to the DHCP server; and
forwarding, by the switch directly connected to the DHCP server, the first DHCP discover packet to the DHCP server according to the packet-out message.

10. The method for acquiring the IP address by the DHCP client according to claim 8, wherein reporting, by the switch directly connected to the DHCP server, the packet to the controller, wherein the reported packet comprises the DHCP offer packet and the port of the switch to communicate with the DHCP server comprises reporting, by the switch directly connected to the DHCP server, a packet-in message to the controller, wherein the packet-in message comprises an openflow message header and a payload, wherein the openflow message header comprises the port, and wherein the payload comprises the DHCP offer packet.

11. The method for acquiring the IP address by the DHCP client according to claim 7, wherein the address information of the DHCP server comprises an IP address of the DHCP server and a Media Access Control (MAC) address of the DHCP server.

12. A controller, connected to a network, wherein the network comprises the controller and at least one switch, and wherein the controller is configured to:
generate a first DHCP discover packet;
send the first DHCP discover packet to all switches in the network so that a switch directly connected to a DHCP server forwards the first DHCP discover packet to the DHCP server, and then after the DHCP server generates a DHCP offer packet corresponding to the first DHCP discover packet, the DHCP server sends the DHCP offer packet to the switch directly connected to the DHCP server, wherein the DHCP offer packet comprises address information of the DHCP server;
receive a packet reported by the switch directly connected to the DHCP server, wherein the packet comprises the DHCP offer packet directly connected to the DHCP server and a port of the switch to communicate with the DHCP server;
acquire the address information of the DHCP server according to the DHCP offer packet;
generate, according to the address information and the port, a forwarding rule for forwarding from a switch in a forwarding path between the DHCP client and the DHCP server to the DHCP server; and
send the forwarding rule to the switch in the forwarding path between the DHCP client and the DHCP server so that the switch in the forwarding path between the DHCP client and the DHCP server forwards, to the DHCP server according to the forwarding rule, a second DHCP discover packet sent by a DHCP client, wherein the DHCP server is configured to allocate an internet protocol (IP) address of the DHCP client to the DHCP client, wherein the forwarding rule is used to indicate a network path from the switch in the forwarding path between the DHCP client and the DHCP server to the DHCP server, and wherein the second DHCP discover packet is sent when the DHCP client needs to acquire the IP address of the DHCP client.

13. The controller according to claim 12, wherein the controller is further configured to:
receive the second DHCP discover packet reported by the switch in the forwarding path between the DHCP client and the DHCP server;
generate the forwarding rule according to the address information of the DHCP server and the port; and
send the forwarding rule to the switch in the forwarding path between the DHCP client and the DHCP server so that the switch in the forwarding path between the DHCP client and the DHCP server forwards the second DHCP discover packet to the DHCP server according to the forwarding rule, wherein the DHCP server is configured to allocate the IP address of the DHCP client to the DHCP client.

14. The controller according to claim 13, wherein the controller is further configured to send, to all the switches in the network, a packet-out message carrying the first DHCP discover packet so that all the switches in the network forwards the first DHCP discover packet to the DHCP server according to the packet-out message, wherein the packet-out message is used to instruct the switch to forward the first DHCP discover packet to the DHCP server.

15. The controller according to claim 13, wherein the controller is further configured to receive a packet-in message reported by the switch directly connected to the DHCP server, wherein the packet-in message comprises an openflow message header and a payload, wherein the openflow message header comprises the port, and wherein the payload comprises the DHCP offer packet.

16. The controller according to claim 15, wherein the address information of the DHCP server comprises an IP address of the DHCP server and a Media Access Control (MAC) address of the DHCP server.

17. A switch, connected to a network, wherein the network comprises a controller and at least one switch, and wherein the switch is configured to:
receive a first DHCP discover packet from the controller, wherein the first DHCP discover packet is generated by the controller; and
forward the first DHCP discover packet to a DHCP server so that the DHCP server generates a DHCP offer packet corresponding to the first DHCP discover packet, wherein the DHCP offer packet comprises address information of the DHCP server;
receive the DHCP offer packet from the DHCP server;
report a packet to the controller, wherein the packet comprises the DHCP offer packet and a port of the switch to communicate with the DHCP server so that the controller acquires the address information of the DHCP server according to the DHCP offer packet, and generates, according to the address information and the port, a forwarding rule for forwarding from the switch directly connected to the DHCP server, wherein the forwarding rule is used to indicate a network path from a switch in a forwarding path between the DHCP client and the DHCP server to the DHCP server; and
forward, to the DHCP server according to the forwarding rule, a second DHCP discover packet sent by the DHCP client so that the DHCP server allocates an Internet Protocol (IP) address of the DHCP client to the DHCP client, wherein the second DHCP discover packet is sent when the DHCP client needs to acquire the IP address of the DHCP client.

18. The switch according to claim 17, wherein the switch is further configured to:
receive the second DHCP discover packet from the DHCP client;
report the second DHCP discover packet to the controller so that the controller generates the forwarding rule according to the address information of the DHCP server and the port;
receive the forwarding rule for forwarding from the controller; and
forward the second DHCP discover packet to the DHCP server according to the forwarding rule so that the DHCP server allocates the IP address of the DHCP client to the DHCP client.

19. The switch according to claim 18, wherein the switch is further configured to:
receive a packet-out message from the controller, wherein the packet-out message carries the first DHCP discover packet, and wherein the packet-out message is used to instruct the switch to forward the first DHCP discover packet to the DHCP server; and
forward the first DHCP discover packet to the DHCP server according to the packet-out message.

20. The switch according to claim 18, wherein the switch is further configured to report a packet-in message to the controller, wherein the packet-in message comprises an openflow message header and a payload, wherein the openflow message header comprises the port, and wherein the payload comprises the DHCP offer packet.

21. The switch according to claim 17, wherein the address information of the DHCP server comprises an IP address of the DHCP server and a Media Access Control (MAC) address of the DHCP server.

* * * * *